(12) United States Patent
Lee et al.

(10) Patent No.: US 12,075,411 B2
(45) Date of Patent: Aug. 27, 2024

(54) METHOD AND DEVICE FOR REPORTING CHANNEL STATE INFORMATION IN NR V2X

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 705 days.

(21) Appl. No.: 17/271,987

(22) PCT Filed: Sep. 30, 2019

(86) PCT No.: PCT/KR2019/012752
§ 371 (c)(1),
(2) Date: Feb. 26, 2021

(87) PCT Pub. No.: WO2020/067841
PCT Pub. Date: Apr. 2, 2020

(65) Prior Publication Data
US 2021/0321385 A1    Oct. 14, 2021

(30) Foreign Application Priority Data
Sep. 28, 2018 (KR) .......................... 10-2018-0115758

(51) Int. Cl.
*H04W 72/20* (2023.01)
*H04L 5/00* (2006.01)

(52) U.S. Cl.
CPC ........... *H04W 72/20* (2023.01); *H04L 5/0048* (2013.01)

(58) Field of Classification Search
CPC ............................. H04W 72/20; H04L 5/0048
See application file for complete search history.

(56) References Cited

U.S. PATENT DOCUMENTS

| | | | |
|---|---|---|---|
| 2009/0154588 A1 | 6/2009 | Chen et al. | |
| 2014/0177584 A1 | 6/2014 | Ouchi et al. | |
| 2014/0247800 A1* | 9/2014 | Ro .......................... | H04L 5/006 370/329 |
| 2016/0073408 A1* | 3/2016 | Sartori .............. | H04W 72/0453 370/329 |
| 2016/0360437 A1 | 12/2016 | Larsson et al. | |

(Continued)

FOREIGN PATENT DOCUMENTS

JP            2017175628           9/2017

OTHER PUBLICATIONS

PCT International Application No. PCT/KR2019/012752, International Search Report dated Jan. 10, 2020, 4 pages.

(Continued)

*Primary Examiner* — Brenda H Pham
(74) *Attorney, Agent, or Firm* — LEE, HONG, DEGERMAN, KANG & WAIMEY

(57) ABSTRACT

Provided are a method for transmitting sidelink channel state information by a first device (100), and a device supporting same. The method may comprise the steps of: measuring channel states for a plurality of resources; and transmitting, to a second device (200), channel state information associated with a part of the plurality of resources.

18 Claims, 31 Drawing Sheets

(56) References Cited

U.S. PATENT DOCUMENTS

2019/0173612 A1* 6/2019 Kimura ................ H04L 1/0063
2020/0022089 A1* 1/2020 Guo ..................... H04W 24/08

OTHER PUBLICATIONS

Caict, "Consideration on Resource Allocation of NR V2X Sidelink," 3GPP TSG RAN WG1 Meeting #94, R1-1809287, Aug. 2018, 8 pages.

Nokia et al., "CQI reporting mode enhancements for URLLC," 3GPP TSG-RAN WG1 Meeting #94, R1-1808575, Aug. 2018, 7 pages.

* cited by examiner (a)

(b)

(a)

(b)

METHOD AND DEVICE FOR REPORTING CHANNEL STATE INFORMATION IN NR V2X

CROSS-REFERENCE TO RELATED APPLICATIONS

This application is the National Stage filing under 35 U.S.C. 371 of International Application No. PCT/KR2019/012752, filed on Sep. 30, 2019, which claims the benefit of earlier filing date and right of priority to KR Application No. 10-2018-0115758, filed on Sep. 28, 2018, the contents of which is hereby incorporated by reference herein in its entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system needs to estimate an uplink channel or downlink channel for data transmission/reception, system synchronization acquisition, channel information feedback, and so on. In a wireless communication system environment, fading occurs due to multi path time latency. A process of recovering a transmission signal by compensating distortion in a signal, which is caused by an abrupt environment change due to fading, is referred to as channel estimation. Additionally, a channel state for a cell to which the UE belongs or another cell needs to be measured. For channel estimation or channel state measurement, channel estimation is generally performed by using a reference signal (RS), which is mutually known between transceivers.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.
2) Received signal strength indicator (RSSI): RSSI indicates received power measured over the entire band. RSSI includes all of a signal, interference, and thermal noise.
3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in SL communication, since UEs located at different distances perform transmission (e.g., message transmission) using different resources, interference level may be different per a resource. For example, interference level may be very different for each resource. Accordingly, in SL communication, it is necessary for a UE to efficiently measure at least one of sidelink-related quality, sidelink-related measurement(s), and/or sidelink-related channel state(s). In addition, it is necessary for a UE to efficiently feedback or report at least one of sidelink-related quality information, sidelink-related measurement information, and/or sidelink-related channel state information.

Technical Solutions

In an embodiment, provided is a method for transmitting, by a first device (100), sidelink (SL) channel state information. The method may comprise: measuring channel states for a plurality of resources; and transmitting, to a second device (200), channel state information related to a partial resource among the plurality of resources.

In another embodiment, provided is a method for receiving, by a second device (200), sidelink (SL) channel state information. The method may comprise: receiving, from a first device (100), channel state information related to a partial resource among a plurality of resources, wherein the partial resource may be selected based on channel states for the plurality of resources.

In another embodiment, provided is a first device (100) transmitting sidelink (SL) channel state information. The first device (100) may comprise: one or more memories; one or more transceivers; and one or more processors connected to the one or more memories and the one or more transceivers. The one or more processors may be configured to: measure channel states for a plurality of resources; and control the one or more transceivers to transmit, to a second device (200), channel state information related to a partial resource among the plurality of resources.

Effects of the Disclosure

A UE can perform SL communication efficiently.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
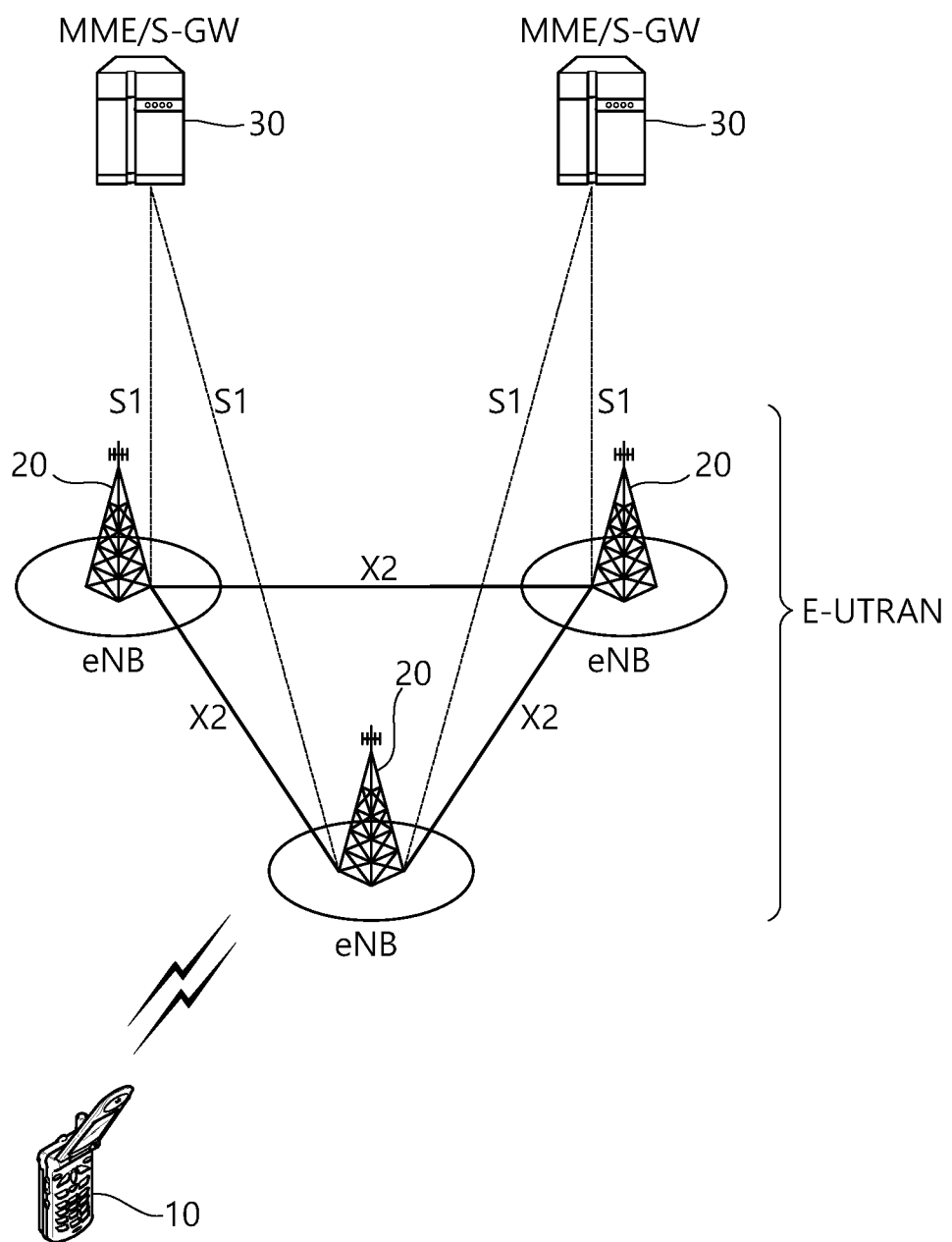
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
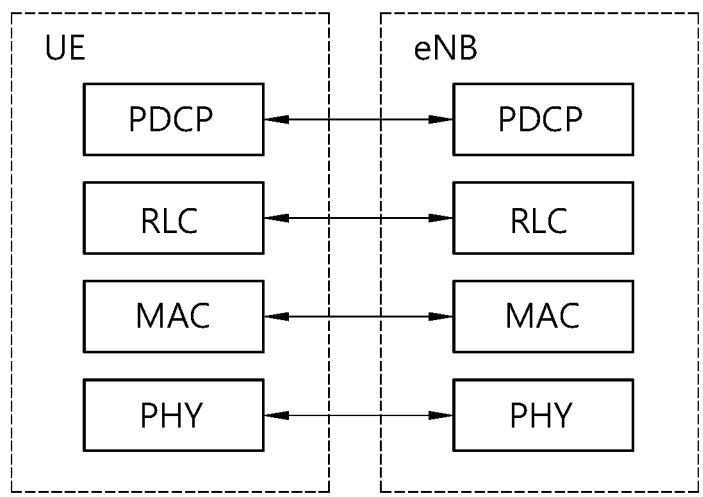
FIG. 2 shows a radio protocol architecture of a user plane, in accordance with an embodiment of the present disclosure.
Figure 3:
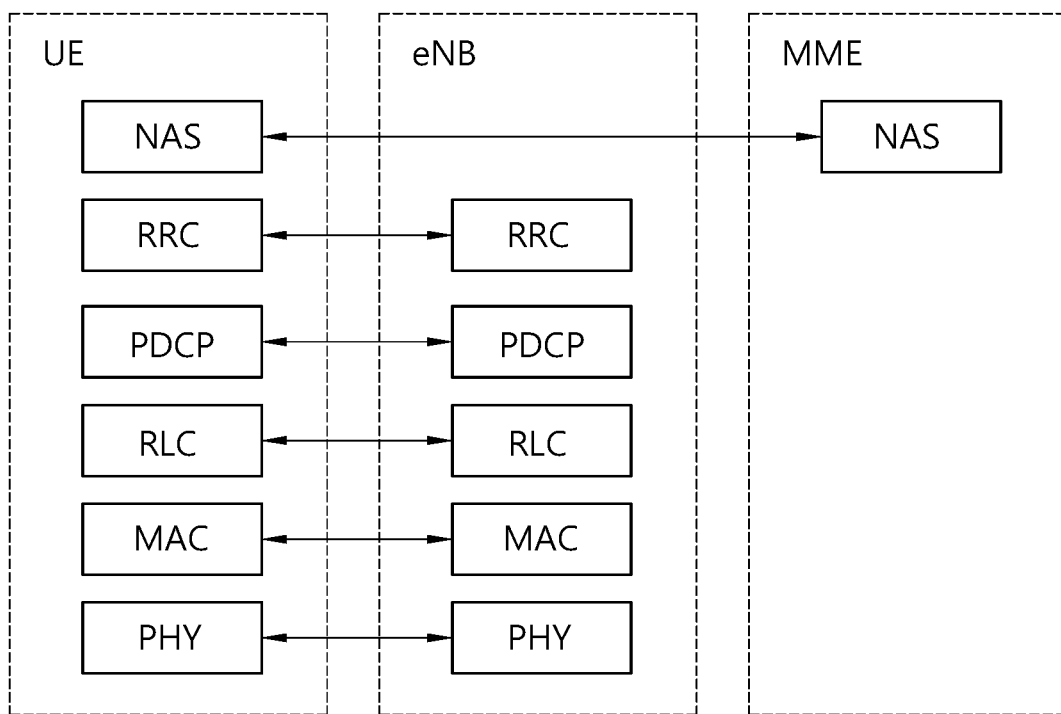
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
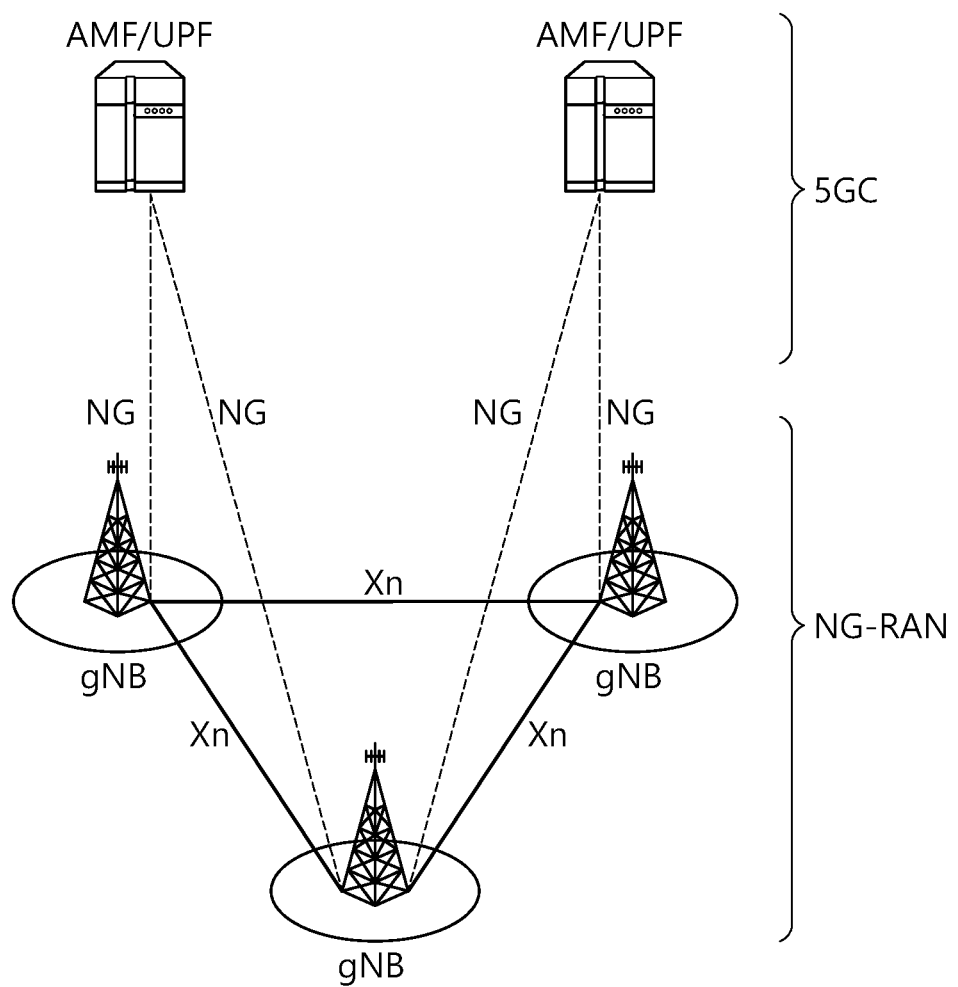
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
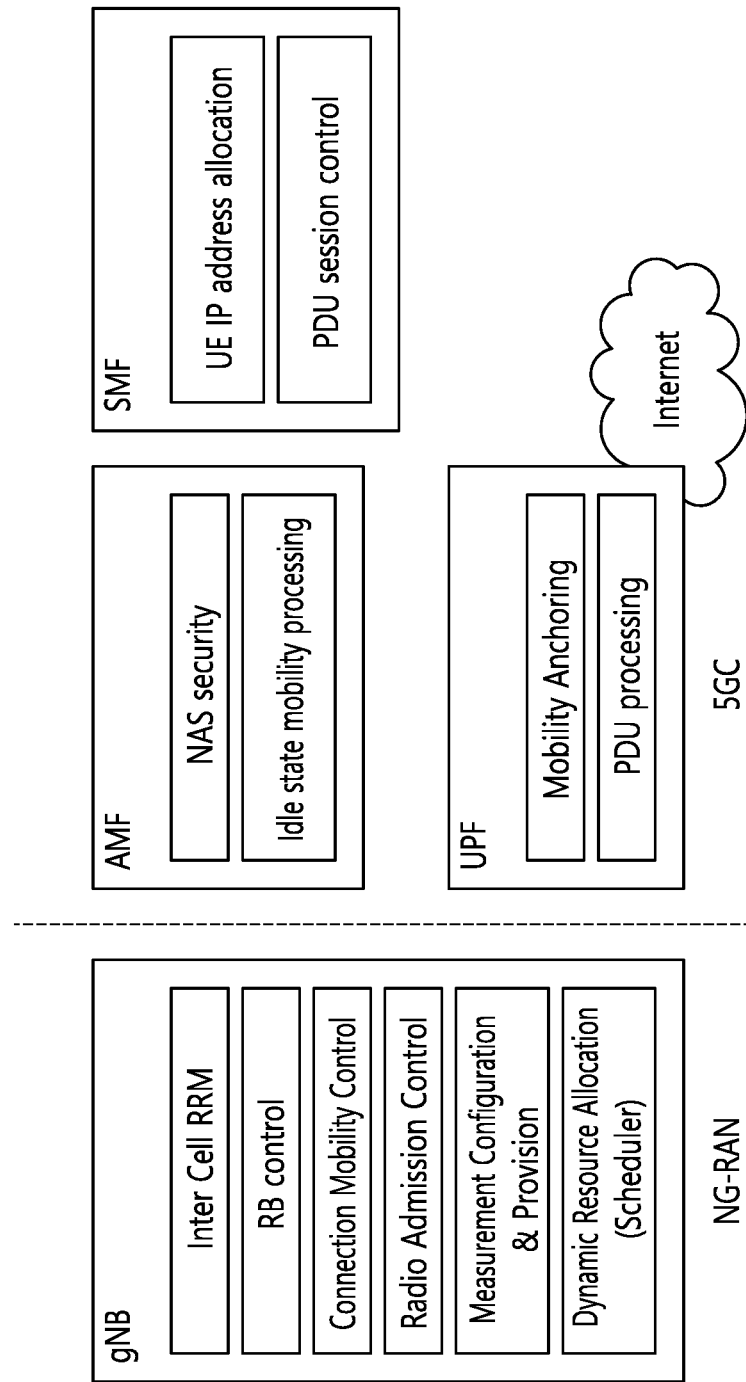
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
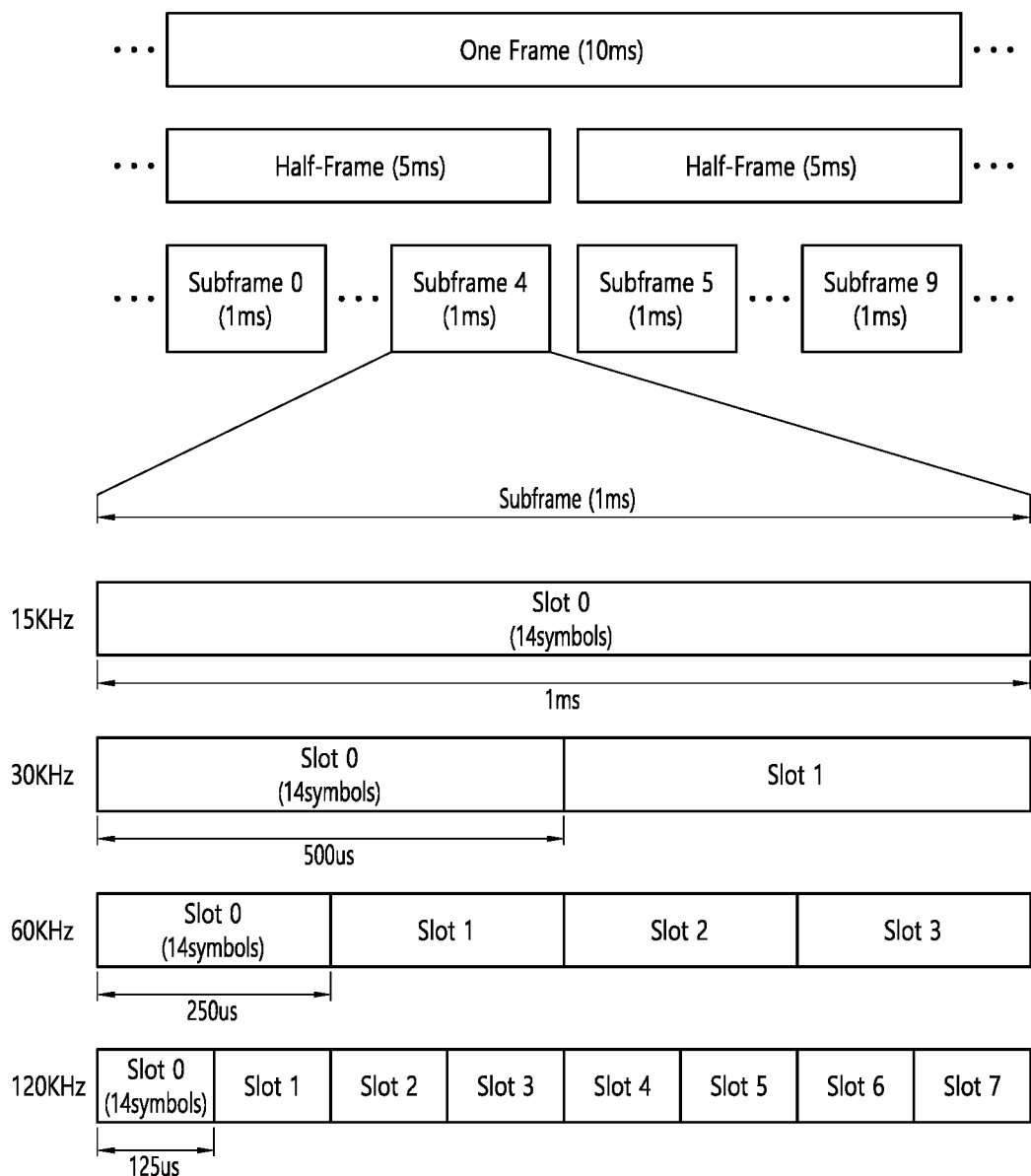
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz - 6000 MHz | 15, 30, 60 kHz |
| FR2 | 24250 MHz - 52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., autonomous driving).

TABLE 4

| Frequency Range designation | Corresponding frequency range | Subcarrier Spacing (SCS) |
|---|---|---|
| FR1 | 410 MHz - 7125 MHz | 15, 30, 60 kHz |
| FR2 | 24250 MHz - 52600 MHz | 60, 120, 240 kHz |

Figure 7:
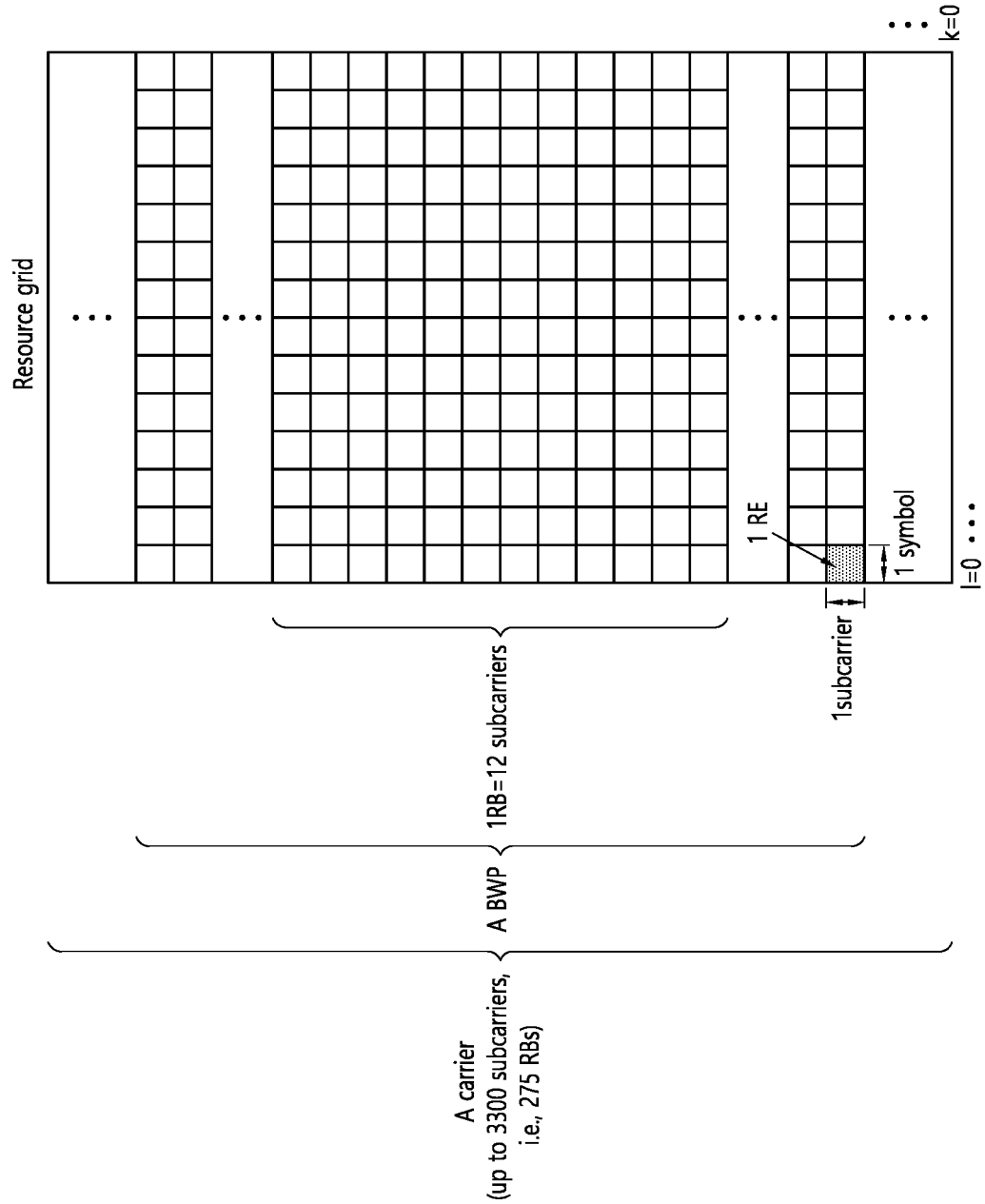
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
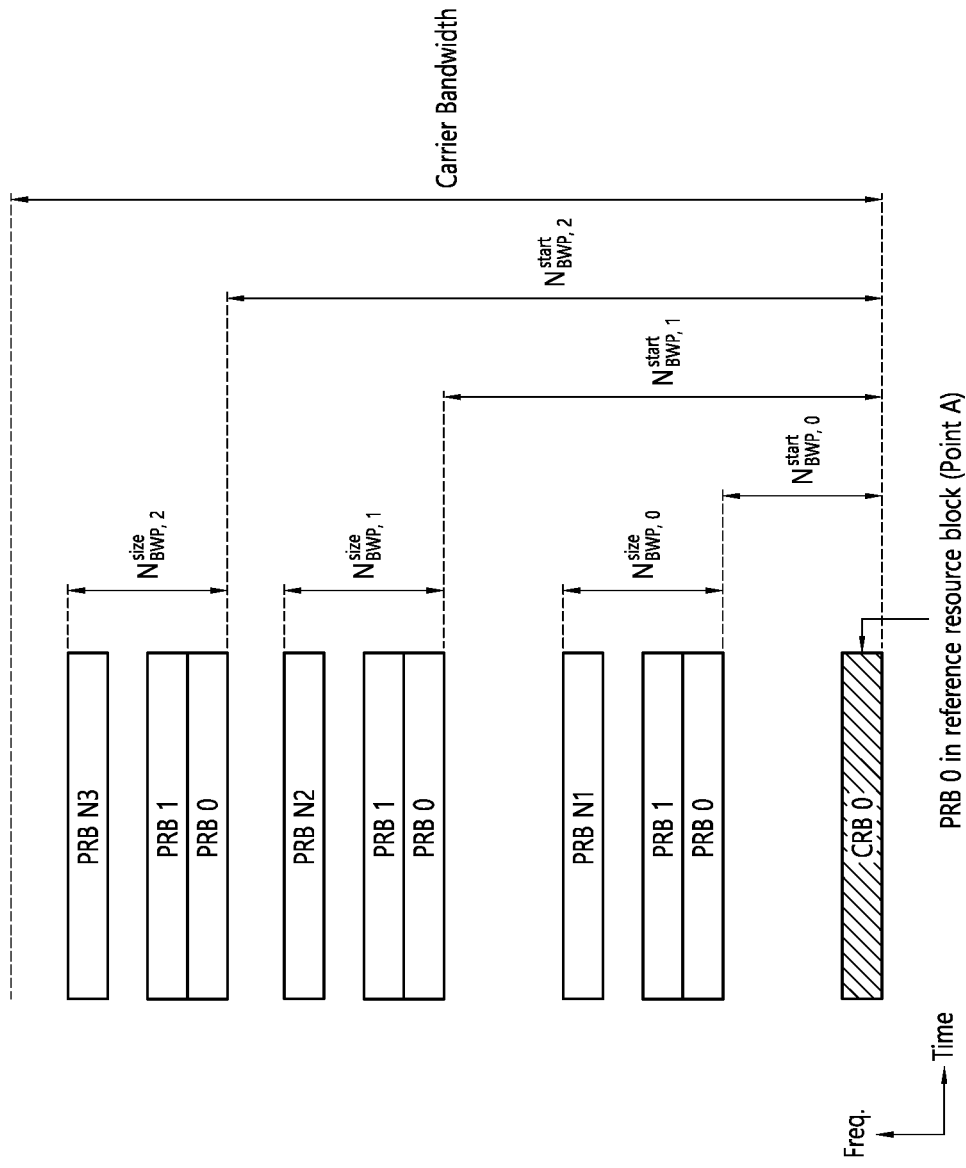
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

Figure 9:
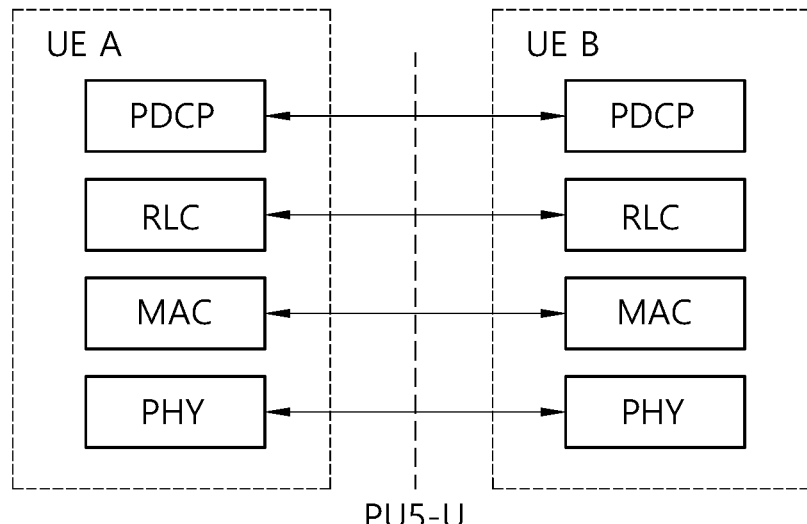
FIG. 9 shows a protocol stack for a SL communication, in accordance with an embodiment of the present disclosure.
Figure 9:
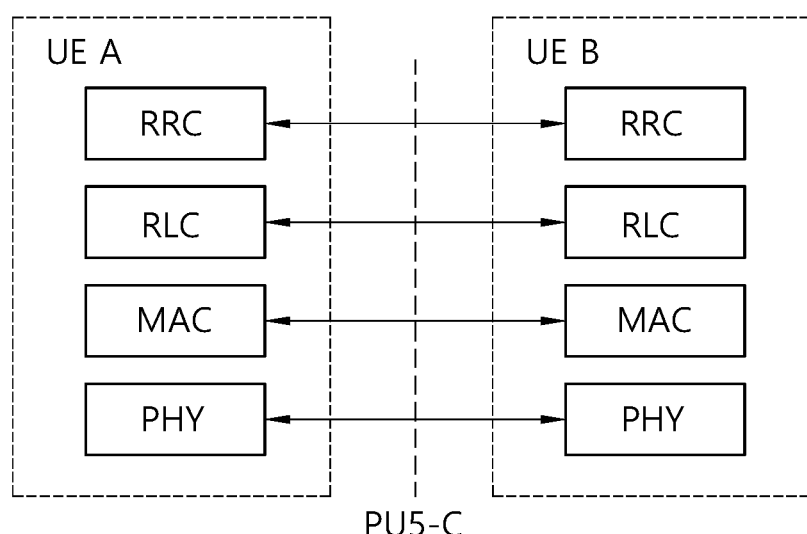

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

Figure 10:
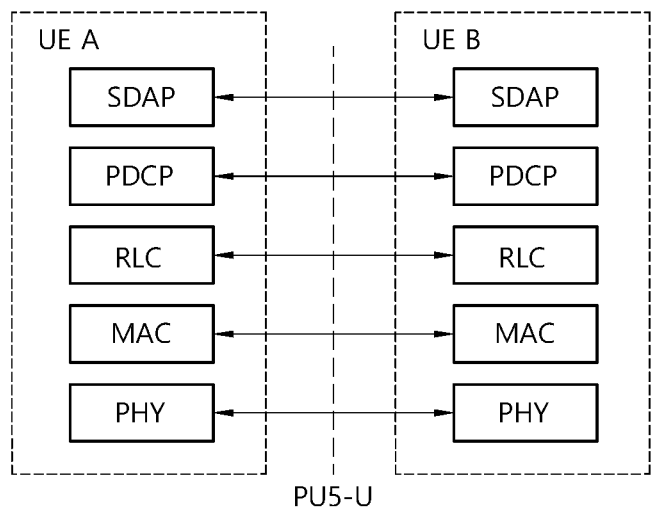
FIG. 10 shows a protocol stack for a SL communication, in accordance with an embodiment of the present disclosure.
Figure 10:
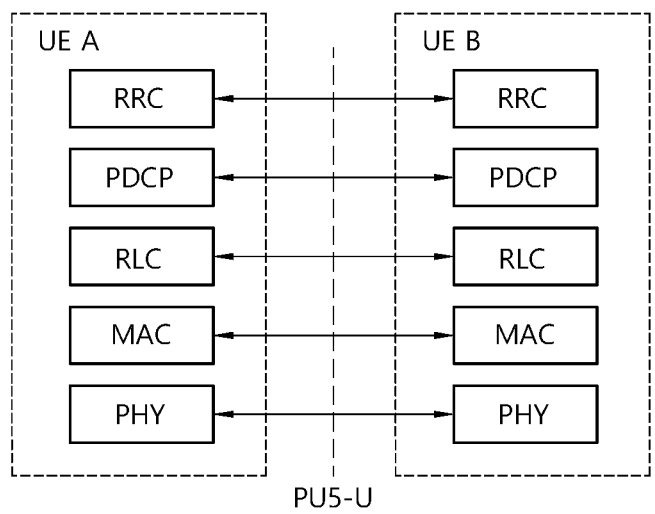

FIG. 10 shows a protocol stack for a SL communication, in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink—Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may correspond to value being used by a network, and values from 168 to 335 may correspond to value being used outside of the network coverage.

Figure 11:
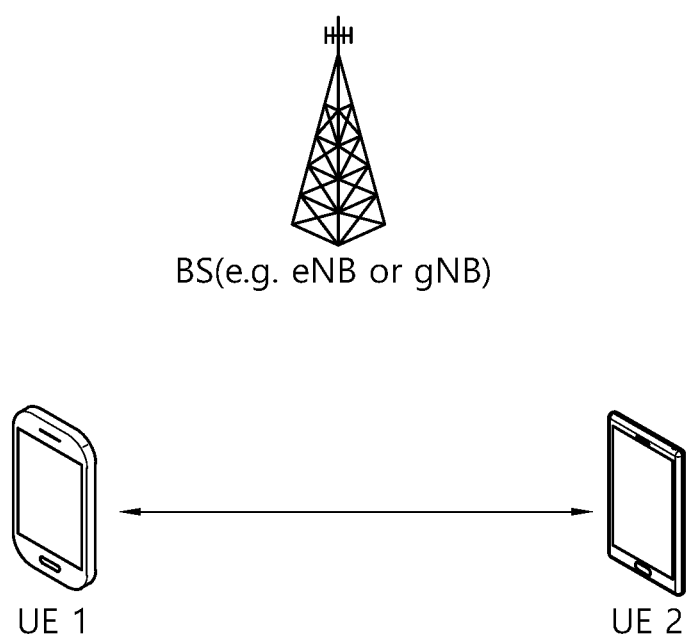
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
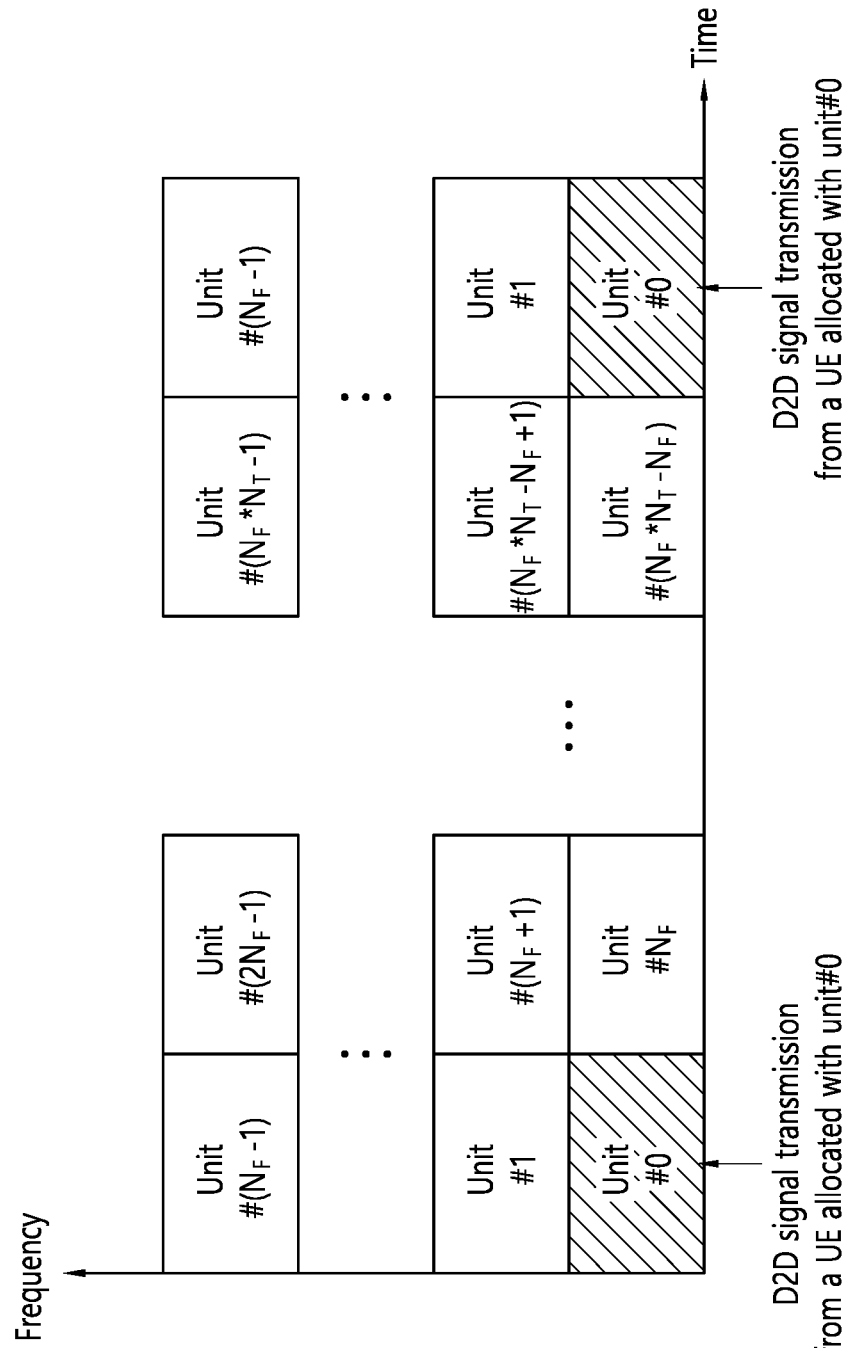
FIG. 12 shows a resource unit for V2X or SL communication, in accordance with an embodiment of the present disclosure.

FIG. 12 shows a resource unit for V2X or SL communication, in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may correspond to a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
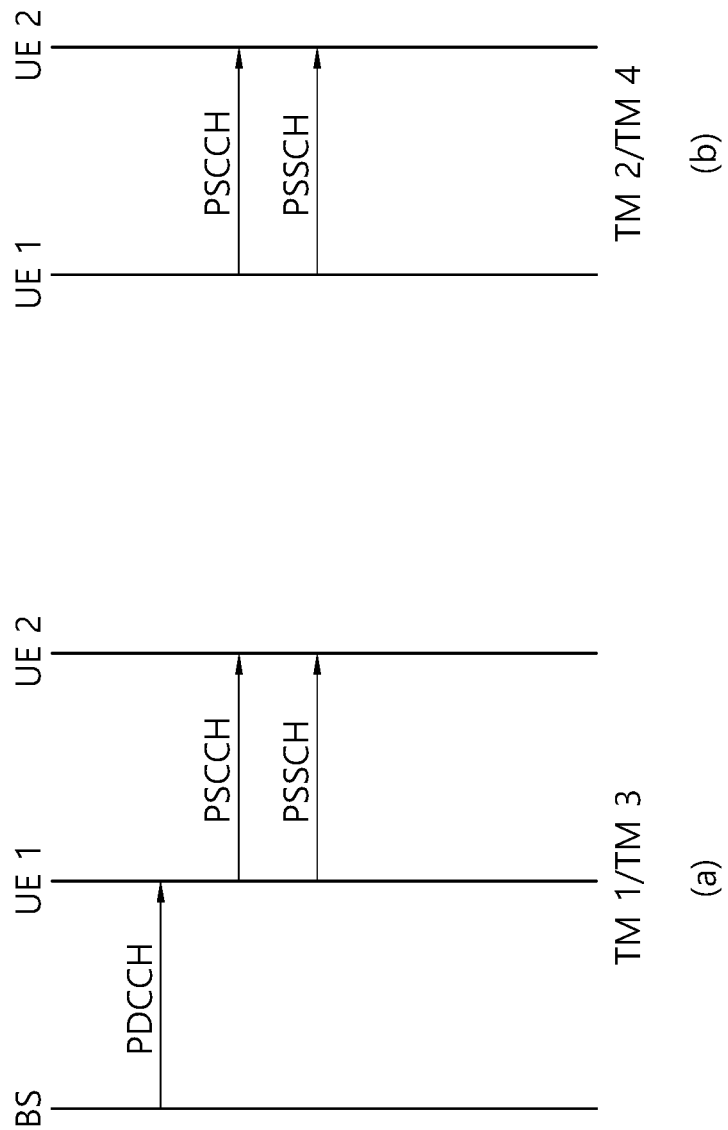
FIG. 13 shows procedures of a UE performing V2X or SL communication according to a transmission mode (TM), in accordance with an embodiment of the present disclosure.

FIG. 13 shows procedures of a UE performing V2X or SL communication according to a transmission mode (TM), in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
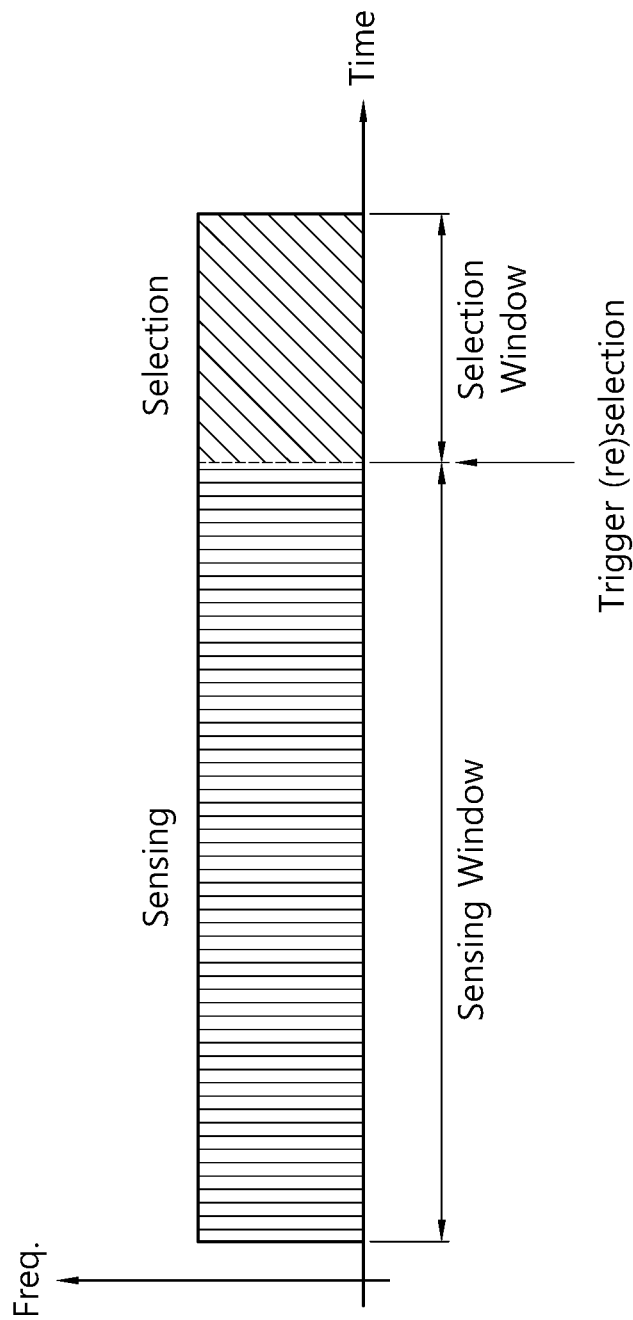
FIG. 14 shows a method of selecting a transmission resource by a UE, in accordance with an embodiment of the present disclosure.

FIG. 14 shows a method of selecting a transmission resource by a UE, in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Figure 15:
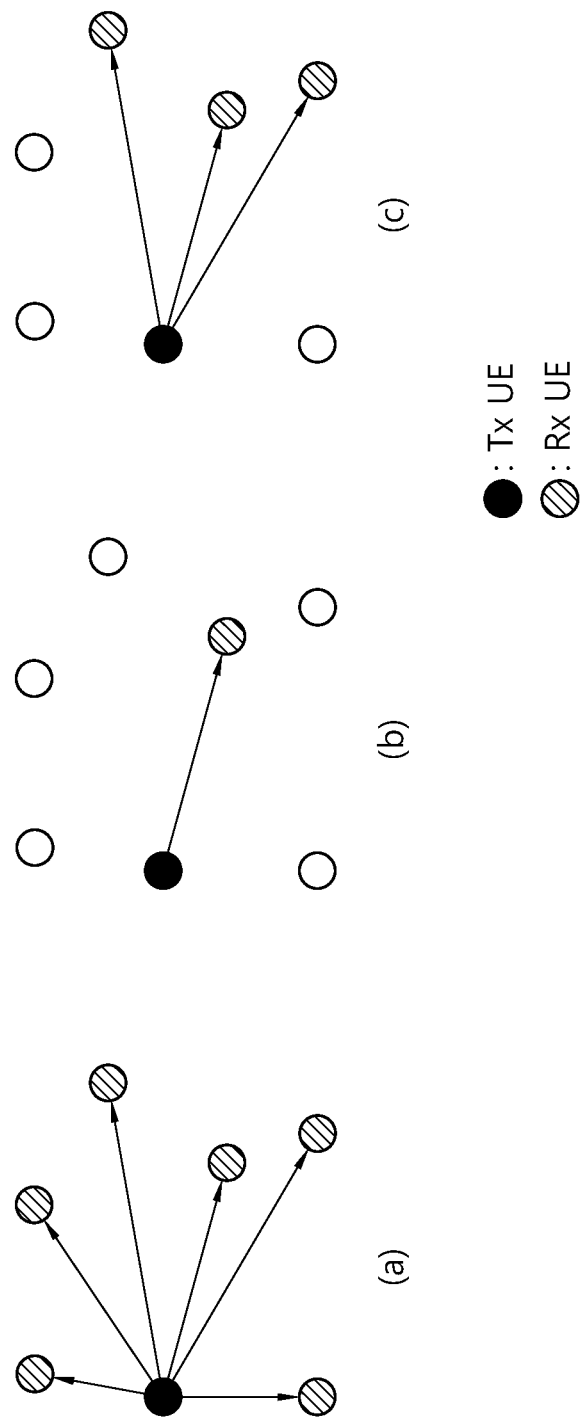
FIG. 15 shows three different cast types, in accordance with an embodiment of the present disclosure.

FIG. 15 shows three different cast types, in accordance with an embodiment of the present disclosure.

More specifically, (a) of FIG. 15 shows a broadcast type SL communication, (b) of FIG. 15 shows a unicast type SL communication, and (c) of FIG. 15 shows a groupcast type SL communication. In case of the broadcast type SL communication, the UE may perform one-to-one communication with another UE. And, in case of the unicast type SL communication, the UE may perform SL communication with one or more other UEs within the group to which the corresponding UE belongs. In the various embodiments of the present disclosure, the SL groupcast communication may be replaced with SL multicast communication, SL one-to-many communication, and so on.

Meanwhile, in case a transmitting UE (adaptively) performs communication between the transmitting UE and a receiving UE by considering channel state(s) related to SL or link quality related SL, service-related requirements, target service-related requirements, and/or QoS can be efficiently satisfied. For example, communication between the transmitting UE and the receiving UE may include at least one of PC5 interface-based communication, SL communication, and/or V2X communication. In various embodiments of the present disclosure, SL communication may include PC5 interface-based communication or V2X communication.

Meanwhile, in SL communication, since UEs located at different distances perform transmission (e.g., message transmission) using different resources, interference level may be different per a resource. For example, interference level may be very different for each resource. Accordingly, in SL communication, it is necessary for a UE to efficiently measure at least one of sidelink-related quality, sidelink-related measurement(s), and/or sidelink-related channel state(s). In addition, it is necessary for a UE to efficiently feedback or report at least one of sidelink-related quality information, sidelink-related measurement information, and/or sidelink-related channel state information. Hereinafter, according to various embodiments of the present disclosure, a method for a UE to report channel state information related to SL and an apparatus supporting the same will be described.

At least one proposed method proposed according to various embodiments of the present disclosure may be applied to at least one of unicast communication, groupcast communication, and/or broadcast communication.

At least one proposed method proposed according to various embodiments of the present disclosure may be applied to not only SL communication or V2X communication based on PC5 interface or SL interface (e.g., PSCCH, PSSCH, PSBCH, PSSS/SSSS, etc.), but also SL communication or V2X communication based on Uu interface (e.g., PUSCH, PDSCH, PDCCH, PUCCH, etc.).

In various embodiments of the present disclosure, receiving operations of a UE may include decoding operations and/or receiving operations of a sidelink channel and/or sidelink signal (e.g., PSCCH, PSSCH, PSFCH, PSBCH, PSSS/SSSS, and so on). Receiving operations of a UE may include decoding operations and/or receiving operations of a WAN DL channel and/or a WAN DL signal (e.g., PDCCH, PDSCH, PSS/SSS, and so on). Receiving operations of a UE may include sensing operations and/or CBR measurement operations. In various embodiments of the present disclosure, sensing operations of a UE may include a PSSCH-RSRP measurement operation based on a PSSCH DM-RS sequence, a PSSCH-RSRP measurement operation based on a PSSCH DM-RS sequence, which is scheduled by a PSCCH that is successfully decoded by the UE, a sidelink RSSI (S-RSSI) measurement operation, and/or a S-RSSI measurement operation based on a subchannel related with a V2X resource pool. In various embodiments of the present disclosure, transmitting operations of the UE may include transmitting operations of a sidelink channel and/or sidelink signal (e.g., PSCCH, PSSCH, PSFCH, PSBCH, PSSS/SSSS, and so on). Transmitting operations of the UE may include transmitting operations of a WAN UL channel and/or a WAN UL signal (e.g., PUSCH, PUCCH, sounding reference signal (SRS), and so on). In various embodiments of the present disclosure, a synchronization signal may include a SLSS and/or PSBCH.

In various embodiments of the present disclosure, configuration may include signaling, signaling from a network, configuration from a network, and/or a pre-configuration from a network. In various embodiments of the present disclosure, definition may include signaling, signaling from a network, configuration from a network, and/or a pre-configuration from a network. In various embodiments of the present disclosure, designation may include signaling, signaling from a network, configuration from a network, and/or a pre-configuration from a network.

In various embodiments of the present disclosure, ProSe Per Packet Priority (PPPP) may be replaced with ProSe Per Packet Reliability (PPPR), and PPPR may be replaced with PPPP. In various embodiments of the present disclosure, as the PPPP value becomes smaller, this may indicate a high priority level, and, as the PPPP value becomes greater, this may indicate a low priority level. In various embodiments of the present disclosure, as the PPPP value becomes smaller, this may indicate a high reliability level, and, as the PPPP value becomes greater, this may indicate a low reliability level. For example, a PPPP value related to a service, packet, or message related to a high priority level may be smaller than a PPPP value related to a service, packet or message related to a low priority level. For example, a PPPR value related to a service, packet or message related to high reliability level may be smaller than a PPPR value related to a service, packet or message related to low reliability level.

In various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In various embodiments of the present disclosure, a carrier may be interpreted as at least one of a BWP and/or a resource pool, and vice versa. For example, a carrier may include at least one of a BWP and/or a resource pool. For example, a carrier may include one or more BWPs. For example, a BWP may include one or more resource pools.

In various embodiments of the present disclosure, channel state information and/or link quality information may include at least one of (SL) channel quality indicator (CQI) information, (SL) rank indicator (RI) information, (SL) precoding matrix indicator (PMI) information, (SL) RSSI information, (SL) interference measurement information, RSRP information, and/or RSRP information related to PSSCH. For convenience of description, in various embodiments of the present disclosure, channel state(s) and/or link quality may be referred to as SL channel state(s), and channel state information and/or link quality information may be referred to as SL channel state information. In various embodiments of the present disclosure, a first UE may be a UE that measures the SL channel state(s) or a UE that feedbacks/reports/transmits the SL channel state information. In various embodiments of the present disclosure, a second UE may be a UE that receives the SL channel state information.

Figure 16:
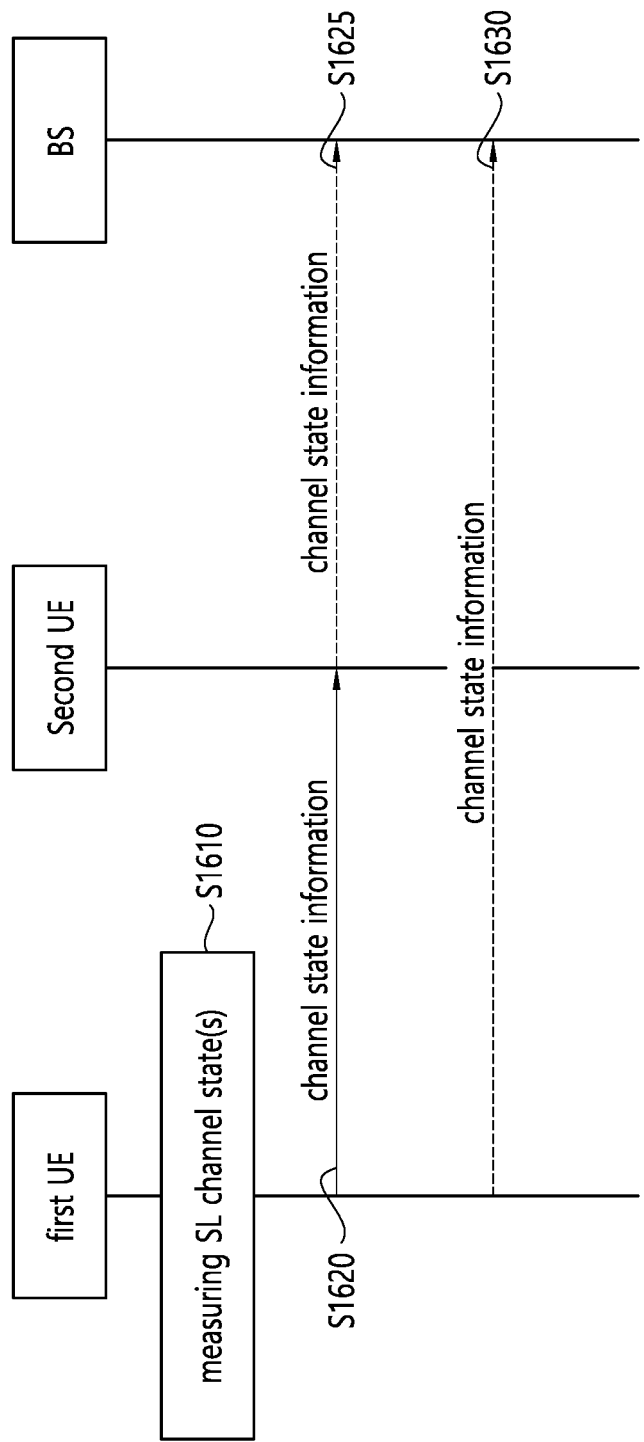
FIG. 16 shows a procedure for a UE to report channel state information related to SL, in accordance with an embodiment of the present disclosure.

FIG. 16 shows a procedure for a UE to report channel state information related to SL, in accordance with an embodiment of the present disclosure.

Referring to FIG. 16, in step S1610, the first UE may measure the SL channel state(s). For example, the first UE may measure the SL channel state(s) for all resources, all resource sets, or all resource regions. For convenience of description, all resources, all resource sets, or all resource regions may be referred to as T_RSC.

For example, T_RSC may be at least one of the following resource(s) or resource(s) satisfying the following conditions. For example, T_RSC may be configured or designated as at least one of the following resource(s) or resource(s) satisfying the following conditions. Here, for example, T_RSC may be defined and/or determined in terms of a transmitting UE (e.g., the second UE) and/or a receiving UE (e.g., the first UE).

Resource(s) related to SL communication, e.g., resource pool(s) related to SL communication, and/or Resource(s) being used for session(s), e.g., resource(s) being used for SL communication between the first UE and the second UE, and/or Resource(s) not being used for other sessions, e.g., resource(s) not being used for SL communication between other UEs, and/or Reserved or occupied resource(s), e.g., reserved or occupied resource(s) based on sensing, and/or Resource(s) determined as IDLE state, and/or Resource(s) not reserved or occupied by other UEs, and/or Resource(s) with an interference measurement value or an interference level value lower than a pre-configured threshold, e.g., resource(s) with measured RSSI value lower than a pre-configured threshold, and/or Resource(s) on which a reception operation can be performed or has been performed, e.g., resource(s) on which a transmission operation is not performed, and/or Resource(s) on which a decoding operation has been performed successfully, e.g., resource(s) on which decoding of data and/or control information has been successfully performed, and/or Resource(s) configured by a network, e.g., resource(s) configured by the network as T_RSC;

For example, if T_RSC is configured as resource(s) being used for SL communication between the first UE and the second UE, the first UE may derive or obtain SL channel state information for resource(s) on which actual SL communication is performed.

For example, the first UE may measure SL channel state(s) between the second UE and the first UE based on measurement reference signal(s) (hereinafter, referred to as M_RS) periodically or aperiodically transmitted by the second UE.

For example, M_RS may be per-defined. For example, M_RS may be defined in the same form as at least one of CSI-RS, DMRS and/or SRS. Here, for example, interference measurement resource(s) (hereinafter, referred to as IMR) may be separately configured or transmitted. For example, M_RS may be used for measuring desired signal(s).

For example, M_RS may be defined in the form of an un-precoded reference signal. Here, for example, M_RS may be used for channel estimation. For example, the first UE may use M_RS transmitted by the second UE in order to estimate the SL channel state(s) between the first UE and the second UE. In addition, for example, the first UE may select (optimal) PMI and/or RI based on the estimated SL channel state(s).

For example, the second UE may periodically or aperiodically transmit M_RS and/or IMR in the form of independent signal(s). For example, resource pool(s) related to transmission of M_RS and/or IMR may be independently configured.

For example, the second UE may transmit M_RS and/or IMR by including it in a pre-configured channel (e.g., PSCCH or PSSCH). For example, M_RS and/or IMR may be transmitted only when the pre-configured channel is transmitted. Specifically, for example, the CSI-RS may be confined in PSSCH transmission. For example, the second UE may transmit the CSI-RS by including it on PSSCH resource(s).

Here, for example, information on M_RS transmission power may be signaled to the UE through a pre-defined channel (e.g., PSCCH), or may be pre-configured from a network. Additionally/alternatively, for example, information on the transmission power ratio between a resource element (RE) on which M_RS is transmitted and a RE on which data is transmitted may be signaled to the UE through a pre-defined channel (e.g., PSCCH), or may be pre-configured from a network. For example, in case M_RS is transmitted by being included in a data channel (e.g., PSSCH), information on the transmission power ratio between a resource element (RE) on which M_RS is transmitted and a RE on which data is transmitted may be signaled to the UE through a pre-defined channel (e.g., PSCCH), or may be pre-configured from a network.

Here, for example, information on resource(s) through which M_RS is transmitted (e.g., location information for resource(s) through which MRS is transmitted or pattern information for resource(s) through which M_RS is transmitted) may be signaled to the UE through a pre-defined channel (e.g., PSCCH), or may be pre-configured from a network. For example, in case the UE transmits MRS and/or IMR by including it in a pre-configured channel (e.g., PSSCH), information on resource(s) through which M_RS is transmitted may be signaled to the UE through a pre-defined channel (e.g., PSCCH), or may be pre-configured from a network. For example, the resource(s) through which M_RS is transmitted may be the last symbol on a data channel (e.g., PSSCH). For example, the resource(s) through which M_RS is transmitted may be the second symbol from the end of a data channel (e.g., PSSCH). For example, in case the last symbol is used for TX-RX switching, the resource(s) through which M_RS is transmitted may be the second symbol from the end of a data channel (e.g., PSSCH).

In step S1620, the first UE may transmit SL channel state information related to partial resource(s) among T_RSC, to the second UE. For example, the first UE may transmit SL channel state information to the second UE based on an assumption that X percent resource(s) is used among T_RSC. For example, the first UE may transmit SL channel state information related to X percent resource(s) among T_RSC, to the second UE. For example, the X percent resource(s) may include at least one of X percent resource(s) having high interference among T_RSC, X percent resource(s) having low interference among T_RSC, and/or X percent resource(s) randomly selected from T_RSC. For example, the SL channel state information may be transmitted through a pre-defined (independent) channel for a corresponding purpose. For example, the SL channel state information may be transmitted by being piggybacked on a pre-configured channel (e.g., PSSCH).

Additionally, in step S1625, the second UE may transmit SL channel state information received from the first UE, to the base station. For example, the second UE may report SL channel state information received from the first UE to the base station through a pre-defined channel (e.g., PUSCH or PUCCH). Additionally, for example, the second UE may also report identifier information of the first UE that feedbacks the SL channel state information, to the base station.

Alternatively, in step S1630, the first UE may transmit SL channel state information related to partial resource(s) among T_RSC to the base station. For example, the first UE may report SL channel state information to the base station through a pre-defined channel (e.g., PUSCH or PUCCH). Additionally, for example, the first UE may also report identifier information of the second UE transmitting M_RS and/or IMR, to the base station.

For example, as described above, if SL channel state information is reported to the base station, the base station may use information on the estimated (max) traffic and/or information on the estimated (max) message size together with the SL channel state information. Accordingly, the base station can efficiently allocate/control resource pool(s) or resource(s) related to (SL) unicast communication and/or groupcast communication between a transmitting UE and a receiving UE, and can efficiently perform QoS management. For example, information on the estimated (max) traffic and/or information on the estimated (max) message size may be reported from the UE to the base station in advance.

For example, in the case of SL communication, interference may fluctuate significantly. In this case, it may be unnecessary for the first UE to report SL channel state information for the entire T_RSC. For example, in case the interference fluctuations are severe, it may be meaningless to report the SL channel state information determined based on the average value of the interference for the entire T_RSC. Therefore, for example, in SL communication in which interference fluctuations are severe, the first UE needs to report only SL channel state information related to partial resource(s) among T_RSC. Hereinafter, a method for determining or obtaining SL channel state information related to partial resource(s) among T_RSC by the first UE will be described in detail.

For example, after the first UE sorts interference-related values for T_RSC in ascending order, the first UE may obtain or determine SL channel state information by using interference-related values corresponding to the upper X percent. In various embodiments of the present disclosure, the interference-related values or interference values may include at least one of interference measurement values, interference level values, and/or RSSI values. For example, the first UE may obtain or determine SL channel state information by using interference-related values for X percent resource(s) having high interference among interference-related values for T_RSC. For example, X may be positive value. For example, X may be 10. For example, if SL channel state information is SINR type, the amount of resources used by the UE or the amount of resources for which SL channel state information is measured may not affect SL channel state information.

As described above, if the first UE transmits SL channel state information determined based on interference values for X percent resource(s) having high interference among T_RSC to the second UE, the second UE may conservatively perform SL transmission to the first UE. For example, the second UE may determine transmission parameter(s) related to SL by using SL channel state information determined by the first UE based on resource(s) with high interference. Accordingly, in an environment in which interference fluctuations are severe, a possibility of satisfying a target block error rate (BLER) of SL transmission by the second UE may increase.

For example, after the first UE sorts interference-related values for T_RSC in descending order, the first UE may obtain or determine SL channel state information by using interference-related values corresponding to the upper X percent. For example, the first UE may obtain or determine SL channel state information by using interference-related values for X percent resource(s) having low interference among interference-related values for T_RSC. For example, X may be positive value. For example, X may be 10. For example, if SL channel state information is SINR type, the amount of resources used by the UE or the amount of resources for which SL channel state information is measured may not affect SL channel state information.

As described above, if the UE transmits SL channel state information determined based on interference values for X percent resource(s) having low interference among T_RSC to the second UE, the second UE can determine a maximum data throughput or a minimum error rate achievable in SL transmission. For example, if the second UE always determines transmission parameter(s) related to SL by using SL channel state information determined by the first UE based on resource(s) with high interference, the second UE should always perform SL transmission based on a conservative data rate or error rate. For example, despite the presence of resource(s) with low interference, the second UE should determine transmission parameter(s) related to SL by using SL channel state information determined by the first UE based on resource(s) with high interference. Therefore, in addition, if the second UE considers SL channel state information determined by the first UE based on resource(s) with low interference in order to determine transmission parameter(s) related to SL, the second UE may not conservatively determine transmission parameter(s) related to a specific SL service (e.g., a packet of a large payload). In addition, if the second UE considers SL channel state information determined by the first UE based on resource(s) with low interference in order to determine transmission parameter(s) related to SL, the second UE can identify service(s) that can be supported through the corresponding SL. For example, if the achievable maximum throughput or minimum error rate does not satisfy service-related requirements, the second UE may not be able to support the corresponding service(s). In other words, based on SL channel state information determined by the first UE based on resource(s) with low interference, the second UE can perform admission control.

For example, the first UE may obtain or determine SL channel state information by using interference-related values corresponding to X percentage randomly selected from among interference-related values for T_RSC. For example, X may be positive value. For example, X may be 10.

For example, a UE (e.g., the second UE) or the base station may signal/transmit, to a UE which measures SL channel state(s) (e.g., the first UE), information related to the X value and/or information related to T_RSC through a pre-defined channel. Additionally/alternatively, a UE (e.g., the second UE) or the base station may signal/transmit, to a UE which feedbacks/reports SL channel state information (e.g., the first UE), information related to the X value and/or information related to T_RSC through a pre-defined channel. Here, for example, information related to the X value and/or information related to T_RSC may be configured as one. For example, information related to the X value and/or information related to T_RSC may be configured as a plurality. For example, information related to the X value may be configured differently or independently per a service type, per a service priority, per a service-related PPPP, per a service-related PPPR, per a service-related target BLER, and/or per a service-related target SINR. For example, information related to T_RSC may be configured differently or independently per a service type, per a service priority, per a service-related PPPP, per a service-related PPPR, per a service-related target BLER, and/or per a service-related target SINR. For example, the smaller the service-related target BLER, the smaller the X value. For example, the larger the service-related target SINR, the smaller the X value.

For example, M services may have different target BLERs, different target SINRs, different PPPPs, different PPPRs, different priorities, or different types. In case the M services are operated, for example, in case the M services are transmitted/received between the first UE and the second UE, the first UE may be configured to measure and/or feedback/report M SL channel state information for a (specific) X value. For example, in case the M services are transmitted/received between the first UE and the second UE, the first UE may measure M SL channel state information for the (specific) X value, and the first UE may feedback or report M SL channel state information for the (specific) X value to the second UE. In this case, for example, the finally selected CQI value may be defined as the highest CQI index that can be received without exceeding a target BLER or a target SINR.

For example, according to an embodiment of the present disclosure, a UE (e.g., the second UE) that has received SL channel state information may determine SL channel state information, SL channel state distribution information, or SL channel state statistical information in terms of average. Alternatively, for example, the base station that has received SL channel state information may determine SL channel state information, SL channel state distribution information, or SL channel state statistical information in terms of average. Alternatively, for example, a UE (e.g., the first UE) measuring SL channel state(s) may determine SL channel state information, SL channel state distribution information, or SL channel state statistical information in terms of average.

Additionally, the first UE may report information on resource(s) from which SL channel state information is derived/measured. For example, the first UE may report information on X percent resource(s) from which SL channel state information is derived/measured. For example, the information on X percent resource(s) may be location information on X percent resource(s). For example, the first UE may transmit information on X percent resource(s) to the second UE. For example, the first UE may transmit information on X percent resource(s) to the base station. For example, if the first UE reports information on X percent resource(s) from which SL channel state information is derived/measured, a UE or the base station receiving the SL channel state information may determine resource(s) having the corresponding channel state(s). For example, the UE or the base station receiving the SL channel state information can relatively accurately determine the location of the resource(s) having the corresponding channel state(s).

Figure 17:
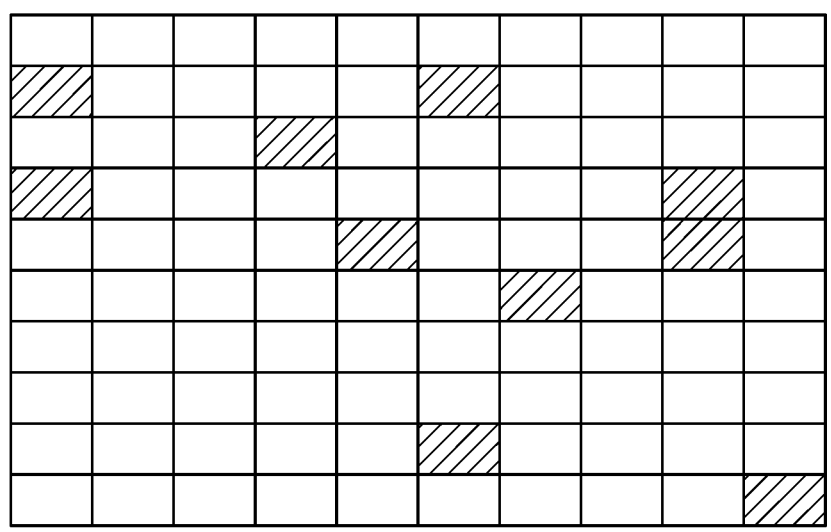
FIG. 17 shows X percent resource(s) with high interference, in accordance with an embodiment of the present disclosure.

FIG. 17 shows X percent resource(s) with high interference, in accordance with an embodiment of the present disclosure.

Referring to FIG. 17, the first UE may select interference-related values corresponding to X percent resource(s) having high interference from among interference-related values measured in T_RSC. In addition, the first UE may obtain or determine SL channel state information by using the selected interference-related values. That is, the first UE may not determine SL channel state information by using all interference-related values measured in T_RSC. On the other hand, the first UE may determine SL channel state information by using interference-related values measured on partial resource(s) with high interference among T_RSC. In the embodiment of FIG. 17, it is assumed that X is 10. Additionally, the first UE may transmit the SL channel state information to the second UE or the base station.

Figure 18:
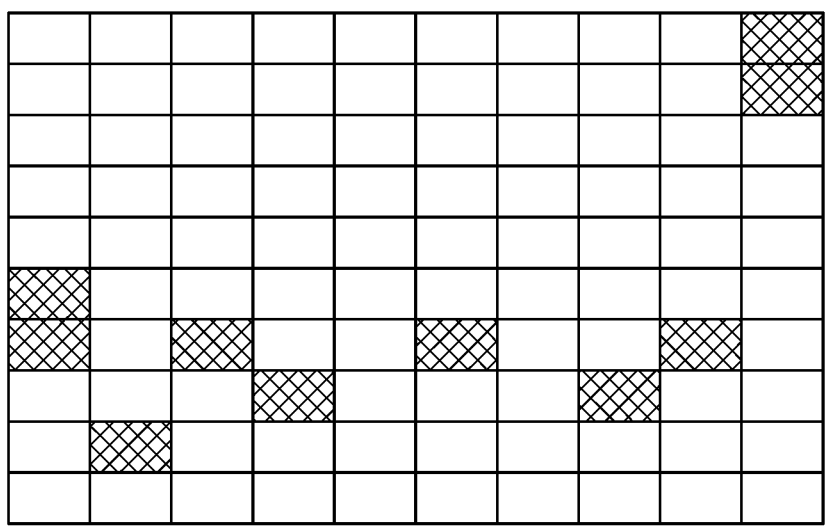
FIG. 18 shows X percent resource(s) with low interference, in accordance with an embodiment of the present disclosure.

FIG. 18 shows X percent resource(s) with low interference, in accordance with an embodiment of the present disclosure.

Referring to FIG. 18, the first UE may select interference-related values corresponding to X percent resource(s) having low interference from among interference-related values measured in T_RSC. In addition, the first UE may obtain or determine SL channel state information by using the selected interference-related values. That is, the first UE may not determine SL channel state information by using all interference-related values measured in T_RSC. On the other hand, the first UE may determine SL channel state information by using interference-related values measured on partial resource(s) with low interference among T_RSC. In the embodiment of FIG. 18, it is assumed that X is 10. Additionally, the first UE may transmit the SL channel state information to the second UE or the base station.

According to an embodiment of the present disclosure, the second UE may signal/transmit information on resource(s) from which SL channel state information is to be derived, to the first UE. For example, the base station may signal/transmit information on resource(s) from which SL channel state information is to be derived, to the first UE. For example, information on resource(s) from which SL channel state information is to be derived may be location information on resource(s) from which SL channel state information is to be derived. For example, information on resource(s) from which SL channel state information is to be derived may be signaled/transmitted through a pre-defined channel. For example, the first UE may be a UE measuring SL channel state(s). For example, the first UE may be a UE that feedbacks or reports SL channel state information. For example, the information on resource(s) from which SL channel state information is to be derived may be comprised of one or a plurality of resource sets. For example, the plurality of resource sets may be resource sets having different interference levels. For example, the plurality of resource sets may be resource sets having different reception and/or measurement interference levels. Here, for example, the first UE may derive/obtain SL channel state information for each resource set, independently.

According to an embodiment of the present disclosure, the first UE may autonomously determine resource(s) from which SL channel state information is to be derived, and may measure SL channel state(s) for the resource(s). For example, the first UE may autonomously determine the location of resource(s) from which SL channel state information is to be derived, and may measure SL channel state(s) on the location of the resource(s). For example, the first UE may be a UE measuring SL channel state(s). For example, the first UE may be a UE that feedbacks or reports SL channel state information. For example, resource(s) from which the SL channel state information is to be derived may be comprised of one or a plurality of resource sets. For example, the plurality of resource sets may be resource sets having different interference levels. For example, the plurality of resource sets may be resource sets having different reception and/or measurement interference levels. Here, for example, the first UE may derive/obtain SL channel state information for each resource set, independently.

According to an embodiment of the present disclosure, the first UE may report a ratio value of resource(s) that can expect corresponding channel state(s). For example, the first UE may report a ratio value of resource(s) that can expect corresponding channel state(s) among T_RSC. For example, the first UE feedbacks/reports not only SL channel state information or pre-configured SL channel state information, but also a ratio value of resource(s) that can expect corresponding channel state(s) among T_RSC. For example, the first UE may measure SL channel state(s) for T_RSC, and the first UE may report a ratio value of resource(s) having specific channel state(s) among the SL channel state(s) for T_RSC. For example, the ratio value may be reported to the second UE or the base station.

For example, SL channel state information may include distribution/statistic information of channel state(s). Here, for example, for SL channel state information measured on T_RSC, the distribution/statistic information of channel state(s) may include at least one of the maximum value of SL channel state information, the minimum value of SL channel state information, the frequency count in which SL channel state information above a pre-configured threshold is measured, the rate in which SL channel state information above a pre-configured threshold is measured, the frequency count in which SL channel state information below a pre-configured threshold is measured, the rate in which SL channel state information below a pre-configured threshold is measured, information on resource(s) in which SL channel state information above a pre-configured threshold is measured, information on resource(s) in which SL channel state information below a pre-configured threshold is measured, the average value of SL channel state information above a pre-configured threshold, the average value of SL channel state information below a pre-configured threshold, SL channel state information included in a pre-configured percentage from the upper part among SL channel state information, SL channel state information included in a pre-configured percentage from the lower part among SL channel state information, the average value of SL channel state information included in a pre-configured percentage from the upper part among SL channel state information, and/or the average value of SL channel state information included in a pre-configured percentage from the lower part among SL channel state information. For example, the information on resource(s) may be location information of resource(s). For example, the information on resource(s) may be a slot index.

According to an embodiment of the present disclosure, a plurality of sessions may be operated/configured. For example, a plurality of sessions may be configured for SL communication between the first UE and the second UE. In this case, for example, a plurality of M_RS may be configured. For example, M_RS may be configured to be a plurality equal to the number of sessions. For example, M_RS may be independently defined for each of a plurality of sessions. Alternatively, for example, M_RS may be configured to be relatively smaller than the number of sessions. For example, M_RS may be shared among a plurality of sessions.

For example, the first UE may independently perform SL channel state measurement for each session. Additionally/alternatively, for example, the first UE may independently perform SL channel state feedback/report for each session. For example, in terms of calculation/measurement of SL channel state information, there may be a plurality of interference measurements for one M_RS. For example, if interference levels are different among different resources, there may be a plurality of interference measurements for one M_RS. For example, in the case of a multicast session, M_RS may be transmitted from a specific UE, and a plurality of UEs receiving the M_RS may independently obtain or calculate interference estimation and/or SL channel state information.

According to an embodiment of the present disclosure, a specific UE may transmit a message, and other UEs which sense the message may determine whether or not to use corresponding resource(s). For example, other UEs which sense the message may determine whether or not to use corresponding resource(s) through which the message is transmitted, according to a pre-defined rule. Here, for example, considering the above procedure, in case a transmitting UE is currently using specific resource(s) for SL communication in specific session(s), SL channel state information obtained from resource(s) other than the specific resource(s) may not necessarily be the same as SL channel state information that can be achieved when the transmitting UE additionally uses (corresponding) resource(s). Thus, for example, SL channel state information may be divided into SL channel state information on resource(s) currently being used in session(s) and SL channel state information assuming that it is not currently being used but will be used in future session(s). For example, SL channel state information may include SL channel state information measured on resource(s) being used for SL communication between the first UE and the second UE and SL channel state information measured on resource(s) not being used for SL communication between the first UE and the second UE. For example, SL channel state information measured on resource(s) being used in current session(s) may be used by a UE for link adaptation (purely). For example, SL channel state information measured on resource(s) that is not currently used but can be used in future session(s) may be used by a UE for QoS prediction.

According to an embodiment of the present disclosure, the second UE may have to perform initial transmission before receiving feedback/reporting of SL channel state information. Additionally/alternatively, for example, the second UE may have to perform initial transmission before the first UE measures SL channel state(s).

In the above case, for example, the second UE may perform initial transmission based on pre-configured SL channel state information. For example, the pre-configured SL channel state information may be default SL channel state information. For example, the pre-configured SL channel state information may be pre-configured for initial transmission of the second UE.

Alternatively, for example, the second UE may perform initial transmission based on previous SL channel state information. For example, the second UE may perform initial transmission based on previously obtained SL channel state information. This may be effective in an environment in which the mobility of the second UE is low.

Alternatively, for example, the second UE may perform initial transmission on pre-configured resource pool(s). For example, the pre-configured resource pool(s) may be an exceptional pool. For example, the pre-configured resource pool(s) may be pre-configured for initial transmission of the second UE.

According to an embodiment of the present disclosure, M_RS transmission resource(s) may always be rate-matched. For example, pre-configured M_RS transmission resource(s) may always be rate-matched upon data mapping regardless of whether M_RS is actually transmitted. Through this, interference on M_RS can be mitigated, and accuracy of M_RS-based channel estimation can be improved.

According to an embodiment of the present disclosure, M_RS transmission may be implemented in a form of packet transmission. For example, the second UE may transmit packet(s) for measuring SL channel state(s) of the first UE, to the first UE. For example, the second UE may transmit pre-configured dummy/payload(s) to the first UE, and the first UE may use the pre-configured dummy/payload(s) as reference signal(s) and/or resource(s) for measuring SL channel state(s). For example, the first UE may measure SL channel state(s) based on the pre-configured dummy/payload(s) transmitted by the second UE.

Meanwhile, in SL communication, the second UE may not always transmit reference signal(s) (e.g., M_RS, IMR, or packet(s)) for channel state measurement, to the first UE, with the same power. For example, in case a transmitting UE should simultaneously perform uplink transmission and SL transmission on different carriers, the transmitting UE may reduce the transmission power of the reference signal(s). Alternatively, for example, in case a transmitting UE performs SL pathloss-based power control, the transmitting UE may change the transmission power of the reference signal(s) due to a change in the distance between the transmitting UE and the receiving UE. As in the above example, the receiving UE may not know exactly the power of the reference signal(s) transmitted by the transmitting UE.

Further, in SL communication, if the second UE receives channel state information from the first UE, the second UE may not know which reference signal(s) has been used for obtaining the channel state information. For example, even though the second UE triggers twice to report channel state information to the first UE, the second UE may receive only one channel state information from the first UE. For example, if the second UE fails to receive one channel state information, the second UE that triggers the report of channel state information twice may receive only one channel state information from the first UE. For example, if the first UE fails to reserve resource(s) and then fails to report channel state information at the time requested by the second UE, the second UE that triggers the report of channel state information twice may receive only one channel state information from the first UE.

Accordingly, in case the first UE reports channel state information to the second UE, the first UE needs to inform the second UE of which reference signal(s) has been used for obtaining the channel state information.

Figure 19:
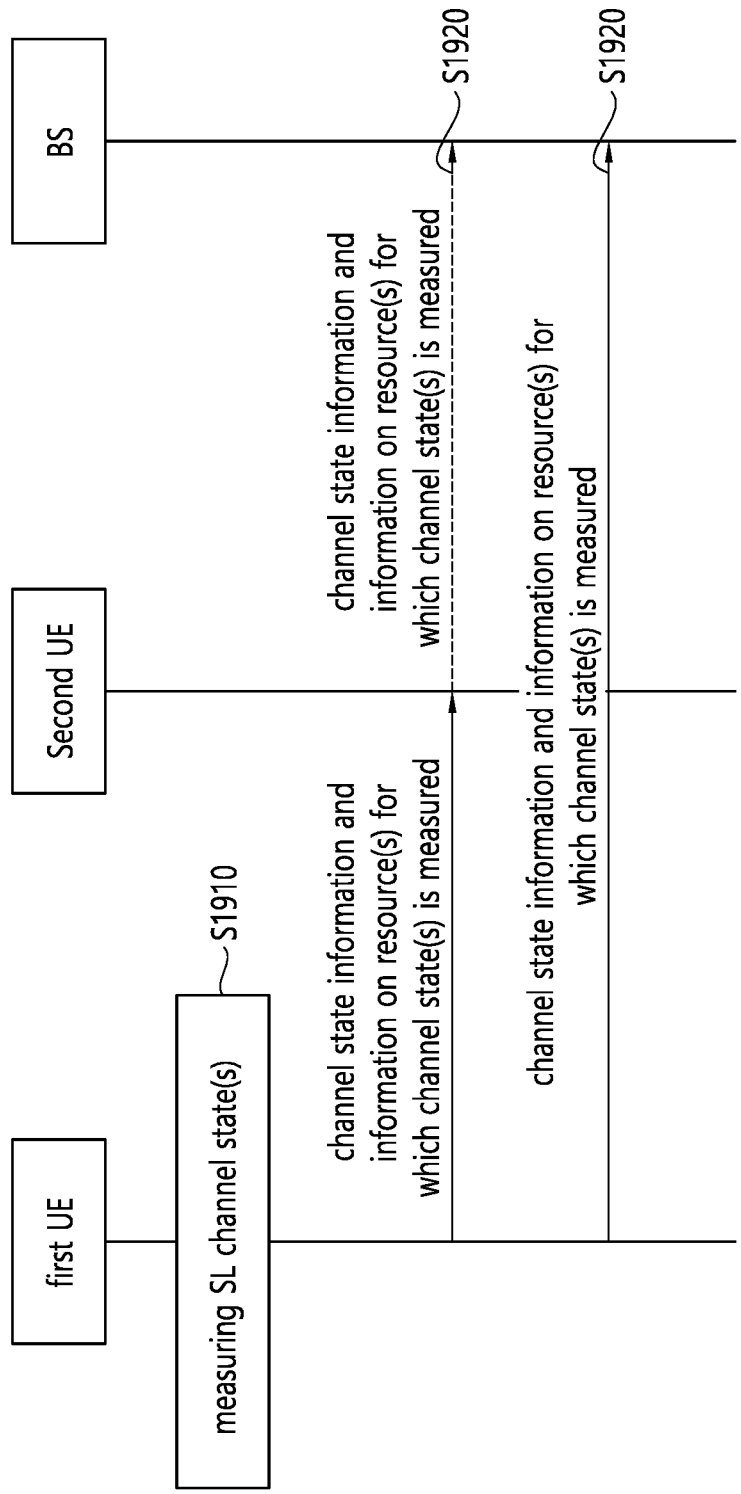
FIG. 19 shows a procedure for a UE to report channel state information related to SL, in accordance with an embodiment of the present disclosure.

FIG. 19 shows a procedure for a UE to report channel state information related to SL, in accordance with an embodiment of the present disclosure.

Referring to FIG. 19, in step S1910, the first UE may measure SL channel state(s). For example, the first UE may measure SL channel state(s) between the first UE and the second UE. For example, the SL channel state(s) may be measured based on at least one of M_RS, IMR, or pre-configured packet(s) transmitted by the second UE. For example, the pre-configured packet(s) may be pre-configured dummy/payload(s). For example, the first UE may derive or obtain SL channel state information through measurement of the SL channel state(s).

In step S1920, the first UE may report information on resource(s) for which SL channel state information is derived and/or measured. For example, the first UE may report location information on resource(s) from which SL channel state information is derived and/or measured. For example, the first UE may report information on frequency domain and/or information on time domain of resource(s) from which SL channel state information is derived and/or measured.

For example, the first UE may report information on resource(s) from which SL channel state information is derived and/or measured, to the second UE. Additionally, for example, the second UE may report information on resource(s) for which SL channel state information is derived and/or measured, to the base station.

Additionally, for example, the first UE may report information on resource(s) for which SL channel state information is derived and/or measured, to the base station.

For example, if the first UE reports information on resource(s) from which SL channel state information is derived and/or measured, the second UE or the base station receiving the SL channel state information can determine resource(s) having the corresponding channel state(s). For example, the second UE or the base station receiving the SL channel state information can relatively accurately determine the location of resource(s) having the corresponding channel state(s). Thus, for example, the second UE can know which reference signal(s), from among reference signal(s) transmitted by the second UE, is used by the first UE for deriving and/or measuring channel state information. Thus, for example, even if the second UE, which triggers the report of the channel state information multiple times, receives only partial channel state information from the first UE, the second UE can know which reference signal(s) is used for obtaining the partial channel state information.

According to various embodiments of the present disclosure, SL communication between a transmitting UE and a receiving UE can be adaptively performed based on the measured SL channel state(s) and/or the reported SL channel state information. Accordingly, service-related requirement(s), target service-related requirement(s), and/or QoS can be efficiently satisfied.

Figure 20:
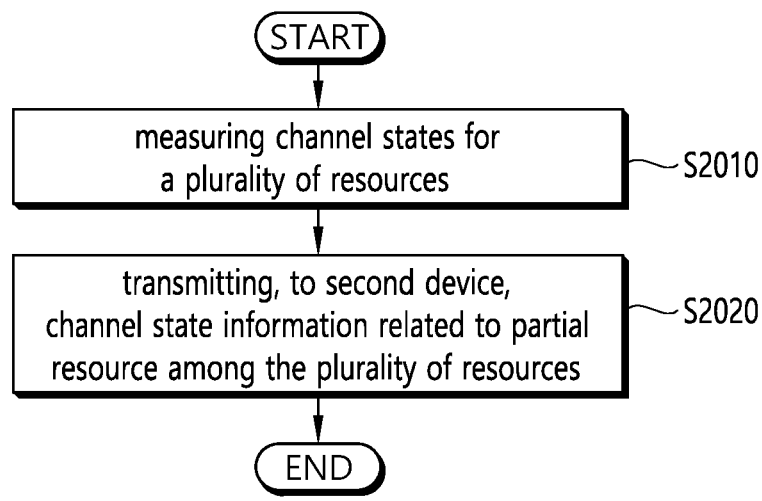
FIG. 20 shows a method for transmitting, by a first device (100), sidelink (SL) channel state information, in accordance with an embodiment of the present disclosure.

FIG. 20 shows a method for transmitting, by a first device (100), sidelink (SL) channel state information, in accordance with an embodiment of the present disclosure. The embodiment of FIG. 20 may be combined with various embodiments of the present disclosure.

Referring to FIG. 20, in step S2010, the first device (100) may measure channel states for a plurality of resources. For example, the plurality of resources may be resources related to SL communication. For example, the plurality of resources may be resources used for SL communication between the first device (100) and the second device (200). For example, the channel state may be measured based on at least one of a reference signal, an interference measurement resource (IMR), or a packet related to channel state measurement. For example, the reference signal may be received from the second device (200), by being included in physical sidelink shared channel (PSSCH).

In step S2020, the first device (100) may transmit, to a second device (200), channel state information related to a partial resource among the plurality of resources.

For example, the channel state information related to the partial resource may be obtained based on channel states of N percent resources having a poor channel state among the plurality of resources. For example, the channel state information related to the partial resource may be obtained based on channel states of N percent resources having a good channel state among the plurality of resources.

Additionally, for example, the first device (100) may receive, from the second device (200), at least one of information on the N or information on the plurality of resources. For example, the first device (100) may receive, from a base station, at least one of information on the N or information on the plurality of resources.

For example, the at least one of information on the N or information on the plurality of resources may be configured based on at least one of a service type, a service priority, a service-related ProSe Per Packet Priority (PPPP), a service-related ProSe Per Packet Reliability (PPPR), a service-related target Block Error Rate (BLER), or a service-related target Signal to Interference plus Noise Ratio (SINR).

Additionally, for example, the first device (100) may transmit, to a base station, the channel state information related to the partial resource.

Additionally, for example, the first device (100) may receive information on the partial resource.

For example, the channel state information may include information on a ratio of resources that is able to expect a specific channel state. For example, the channel state information may include channel state information measured on a resource being used for SL communication between the first device (100) and the second device (200) and channel state information measured on a resource not being used for SL communication between the first device (100) and the second device (200).

The proposed method may be performed by an apparatus according to various embodiments of the present disclosure.

First, the processor (102) of the first device (100) may measure channel states for a plurality of resources. In addition, the processor (102) of the first device (100) may control transceiver (106) to transmit, to a second device (200), channel state information related to a partial resource among the plurality of resources.

Figure 21:
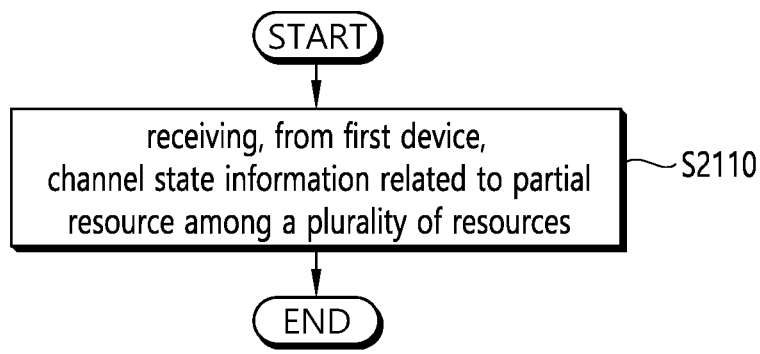
FIG. 21 shows a method for receiving, by a second device (200), sidelink (SL) channel state information, in accordance with an embodiment of the present disclosure.

FIG. 21 shows a method for receiving, by a second device (200), sidelink (SL) channel state information, in accordance with an embodiment of the present disclosure. The embodiment of FIG. 21 may be combined with various embodiments of the present disclosure.

Referring to FIG. 21, in step S2110, the second device (200) may receive, from a first device (100), channel state information related to a partial resource among a plurality of resources. In this case, the partial resource may be selected based on channel states for the plurality of resources. For example, the partial resource may be selected by the first device (100) based on channel states for the plurality of resources.

The proposed method may be performed by an apparatus according to various embodiments of the present disclosure. First, the processor (202) of the second device (200) may control transceiver (206) to receive, from a first device (100), channel state information related to a partial resource among a plurality of resources.

Various embodiments of the present disclosure may be implemented independently. Alternatively, the various embodiments of the present disclosure may be combined or merged with each other. For example, although the various embodiments of the present disclosure have been described based on a 3GPP system for convenience of description, the various embodiments of the present disclosure can extend to other systems apart from the 3GPP system.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
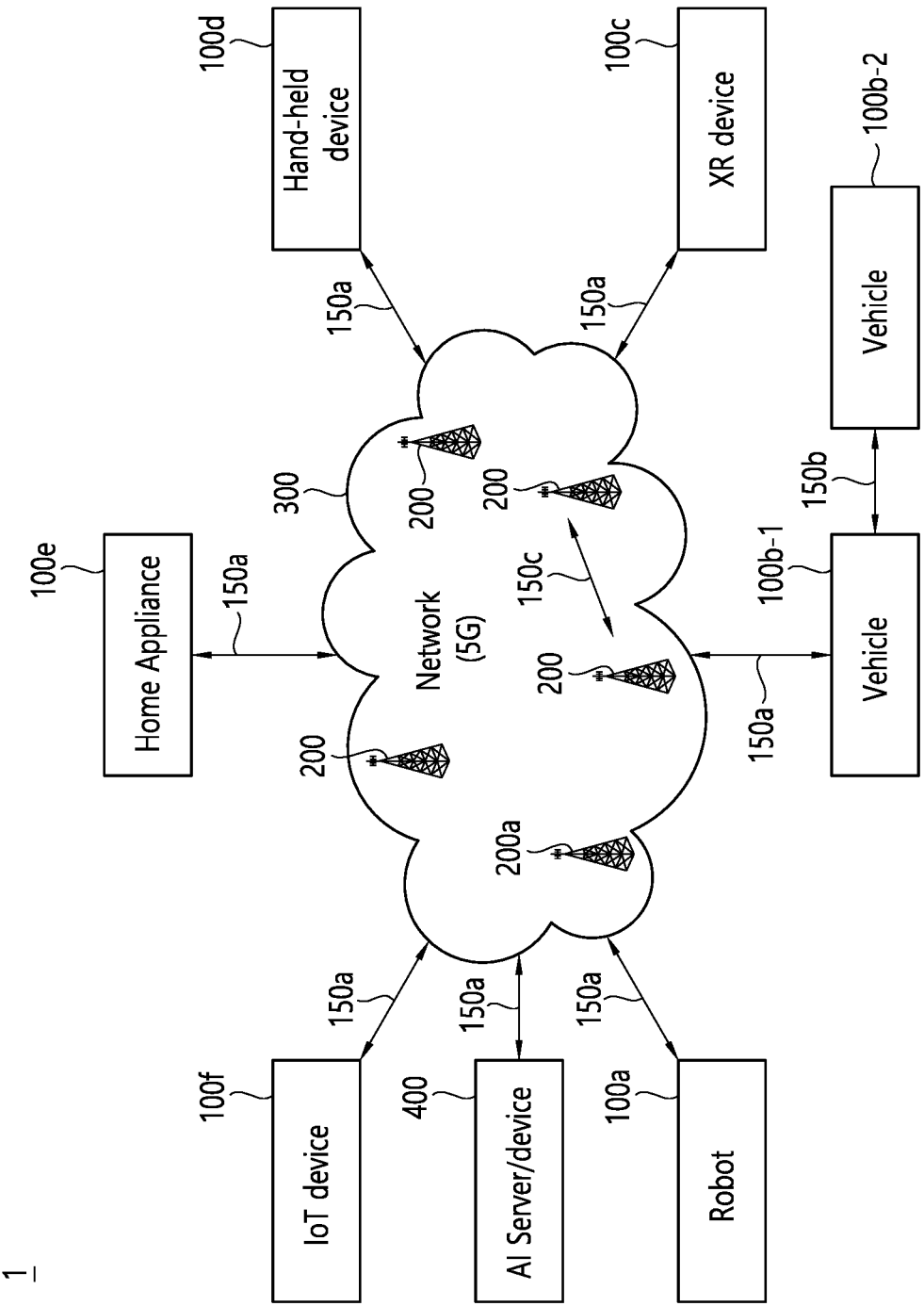
FIG. 22 shows a communication system (1), in accordance with an embodiment of the present disclosure.

FIG. 22 shows a communication system (1) in accordance with an embodiment of the present disclosure.

Referring to FIG. 22, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
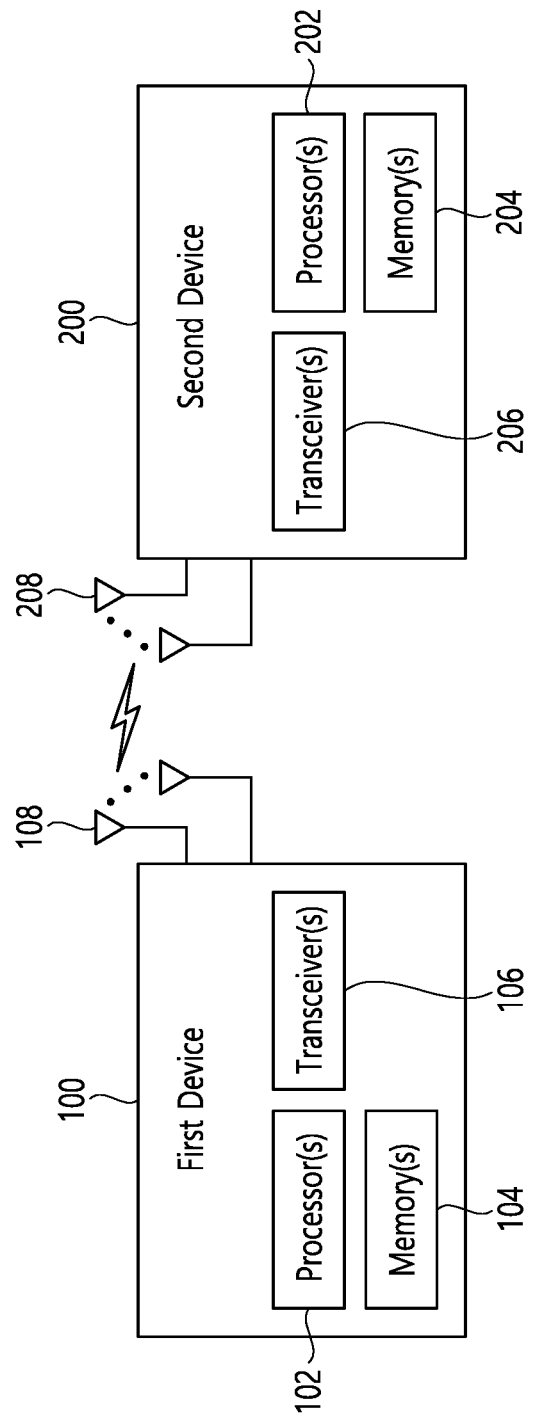
FIG. 23 shows wireless devices, in accordance with an embodiment of the present disclosure.

FIG. 23 shows wireless devices in accordance with an embodiment of the present disclosure.

Referring to FIG. 23, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 24:
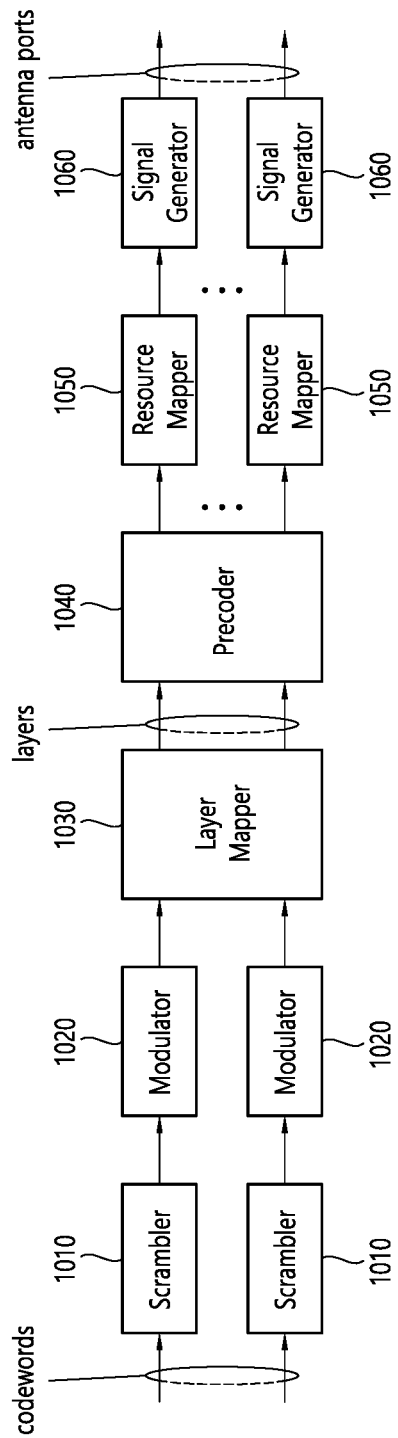
FIG. 24 shows a signal process circuit for a transmission signal, in accordance with an embodiment of the present disclosure.

FIG. 24 shows a signal process circuit for a transmission signal in accordance with an embodiment of the present disclosure.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010~1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
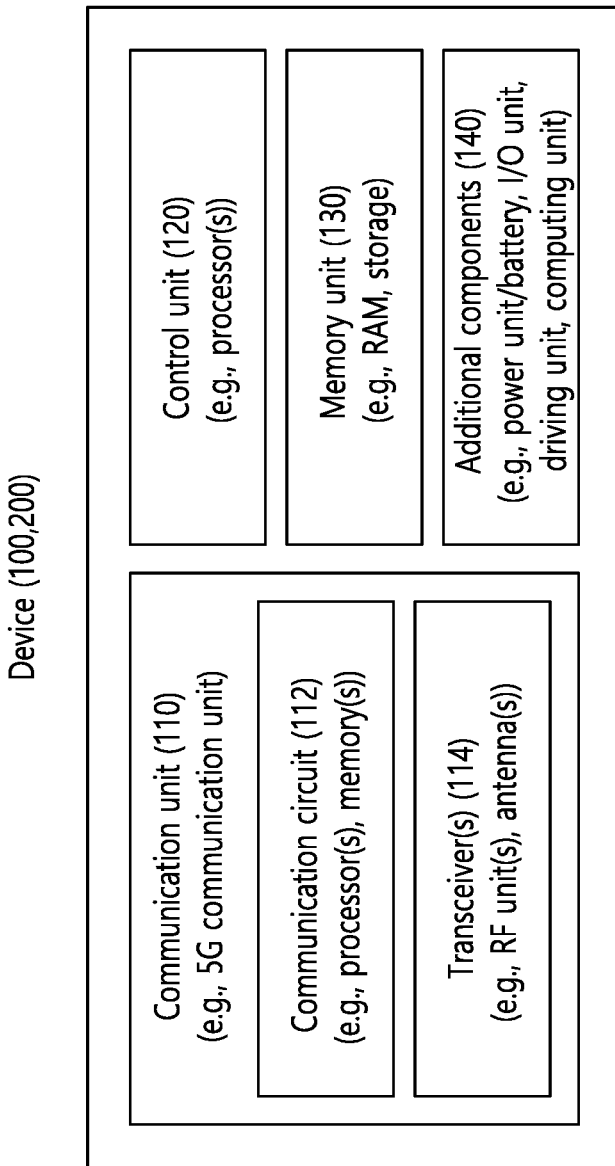
FIG. 25 shows another example of a wireless device, in accordance with an embodiment of the present disclosure.

FIG. 25 shows another example of a wireless device in accordance with an embodiment of the present disclosure. The wireless device may be implemented in various forms according to a use-case/service (refer to FIG. 22).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
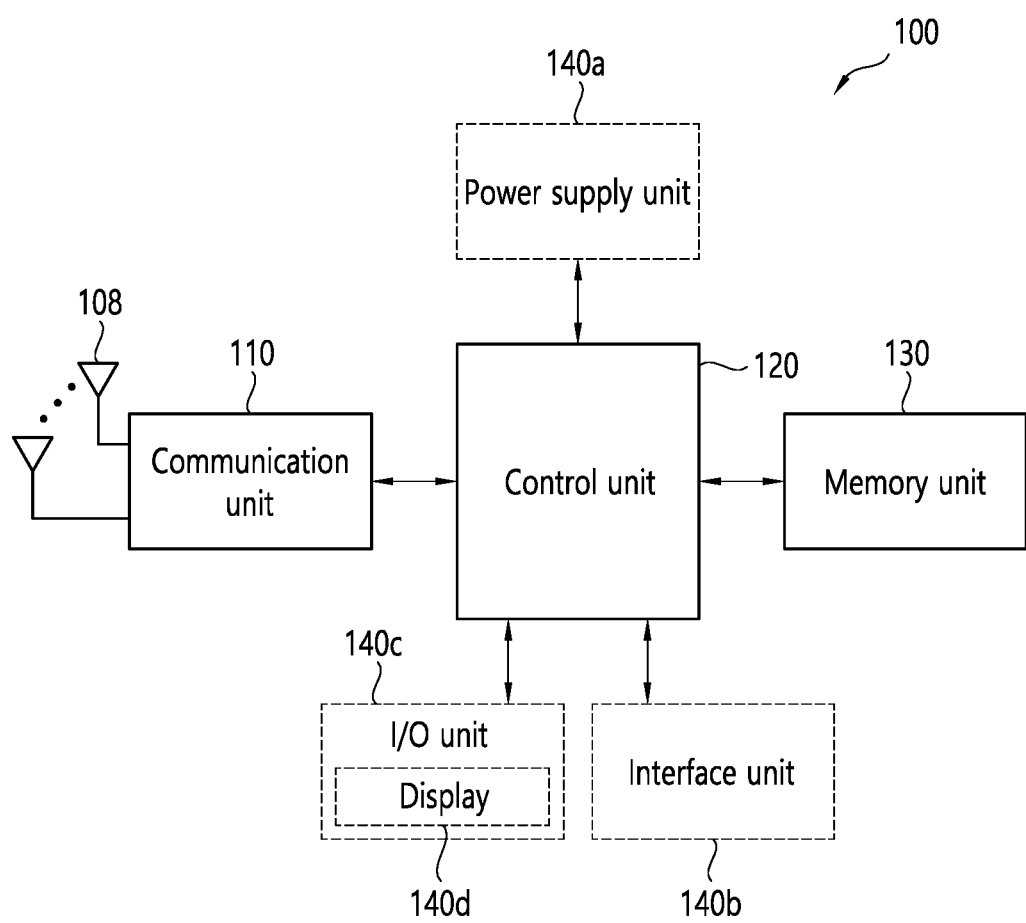
FIG. 26 shows a hand-held device, in accordance with an embodiment of the present disclosure.

FIG. 26 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 27:
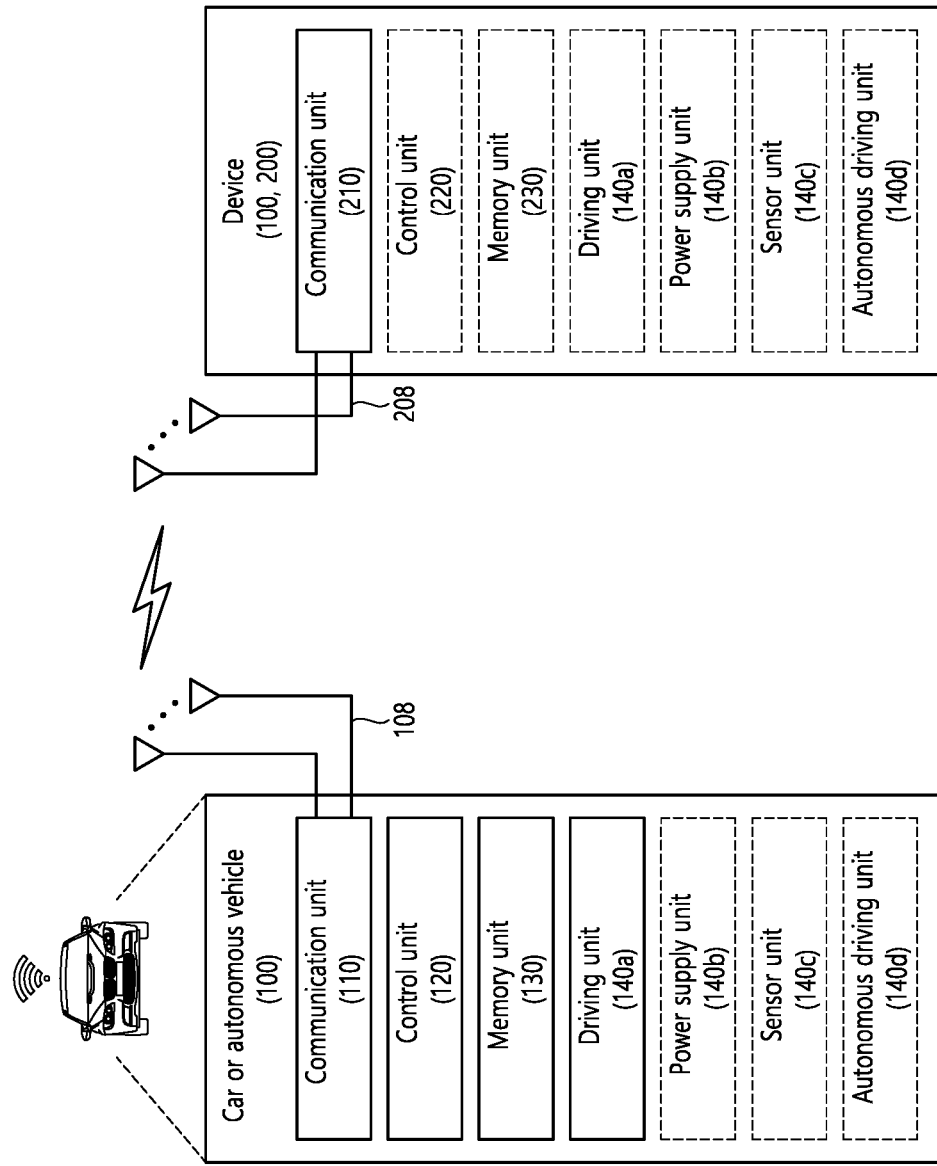
FIG. 27 shows a vehicle or an autonomous vehicle, in accordance with an embodiment of the present disclosure.

FIG. 27 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 28:
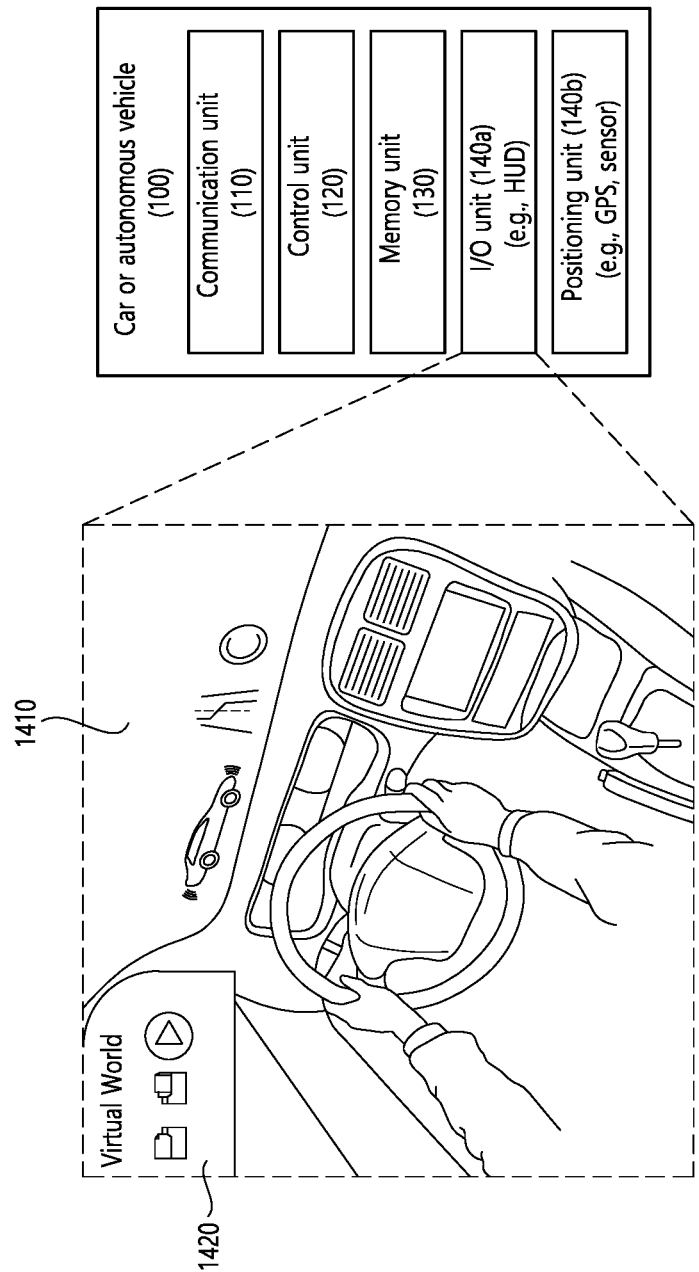
FIG. 28 shows a vehicle, in accordance with an embodiment of the present disclosure.

FIG. 28 shows a vehicle in accordance with an embodiment of the present disclosure. The vehicle may be implemented as a transport means, an aerial vehicle, a ship, etc.

Referring to FIG. 28, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 25.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 29:
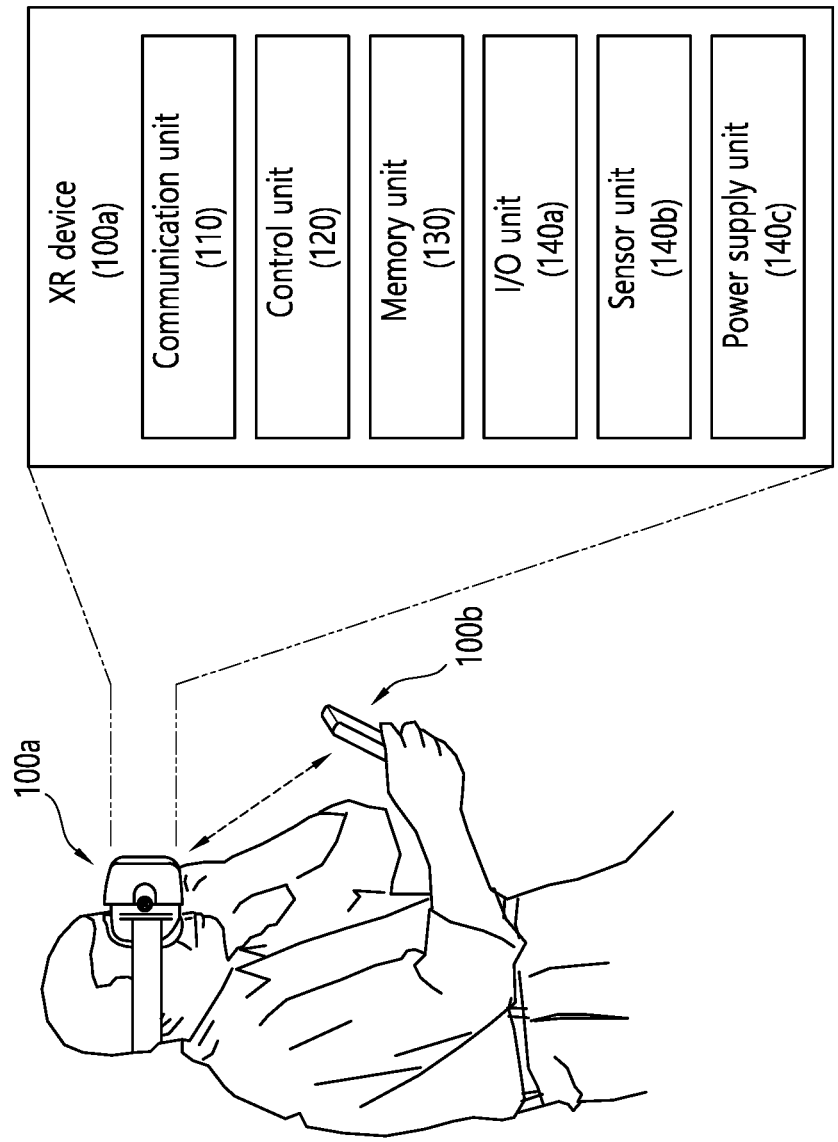
FIG. 29 shows an XR device, in accordance with an embodiment of the present disclosure.

FIG. 29 shows an XR device in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 29, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110~130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, etc. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, etc.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100b) and generate and output an XR object corresponding to the hand-held device (100b).

Figure 30:
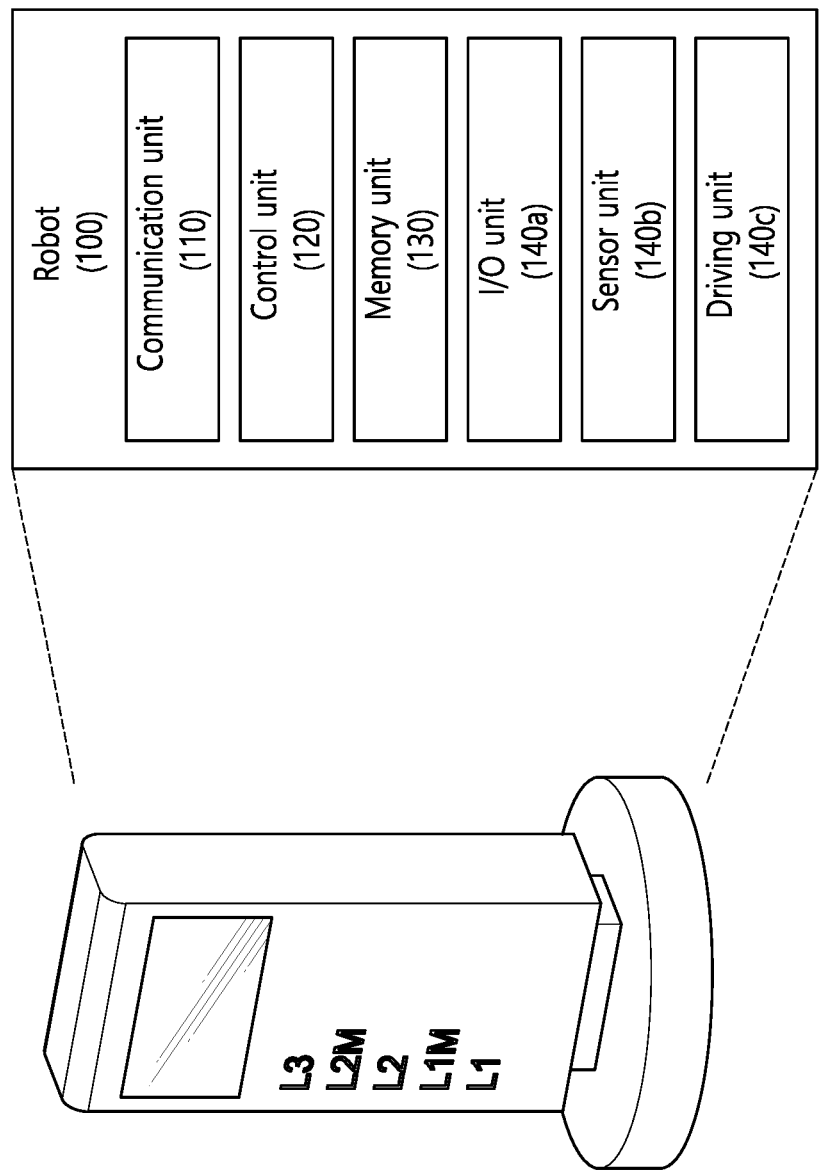
FIG. 30 shows a robot, in accordance with an embodiment of the present disclosure.

FIG. 30 shows a robot in accordance with an embodiment of the present disclosure. The robot may be categorized into an industrial robot, a medical robot, a household robot, a military robot, etc., according to a used purpose or field.

Referring to FIG. 30, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 25, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 31:
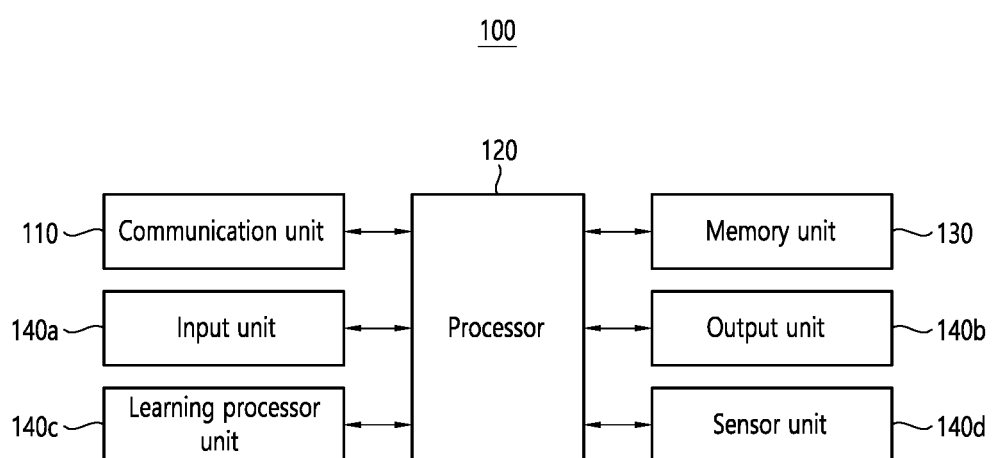
FIG. 31 shows an AI device, in accordance with an embodiment of the present disclosure.

FIG. 31 shows an AI device in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 25, respectively.

The communication unit (110) may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 22). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 22). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, sidelink (SL) communication, the method comprising:
transmitting, to a second device, sidelink control information (SCI) based on a first physical sidelink control channel (PSCCH);
transmitting, to the second device, an aperiodic sidelink channel state information-reference signal (SL CSI- RS) based on a first physical sidelink shared channel (PSSCH) related to the first PSCCH; and receiving, from the second device, channel state information obtained based on the aperiodic SL CSI-RS, wherein the aperiodic SL CSI-RS is transmitted only in a resource used for the first PSSCH related to the first PSCCH.

2. The method of claim 1, wherein the aperiodic SL CSI-RS is not transmitted in a resource for a PSCCH.

3. The method of claim 1, wherein the SCI includes information for triggering a report of the channel state information.

4. The method of claim 1, wherein the channel state information is obtained based on channel state measurement for a partial resource among a plurality of resources.

5. The method of claim 4, wherein the channel state information is obtained based on the channel state measurement for N percent resources having a poor channel state among the plurality of resources.

6. The method of claim 4, wherein the channel state information is obtained based on the channel state measurement for N percent resources having a good channel state among the plurality of resources.

7. The method of claim 5, further comprising:
transmitting, to the second device or a base station, at least one of information on the N or information on the plurality of resources.

8. The method of claim 5, wherein the at least one of information on the N or information on the plurality of resources is configured based on at least one of a service type, a service priority, a service-related ProSe Per Packet Priority (PPPP), a service-related ProSe Per Packet Reliability (PPPR), a service-related target Block Error Rate (BLER), or a service-related target Signal to Interference plus Noise Ratio (SINR).

9. The method of claim 4, wherein the plurality of resources are resources related to SL communication.

10. The method of claim 4, wherein the plurality of resources are resources for the SL communication between the first device and the second device.

11. The method of claim 4, further comprising:
transmitting information on the partial resource.

12. The method of claim 1, further comprising:
transmitting, to a base station, the channel state information.

13. The method of claim 1, wherein the channel state information includes information on a ratio of resources that is able to expect a specific channel state.

14. The method of claim 1, wherein the channel state information includes (i) channel state information measured on a resource being used for the SL communication between the first device and the second device and (ii) channel state information measured on a resource not being used for the SL communication between the first device and the second device.

15. The method of claim 1, wherein the channel state information received from the second device based on a PSSCH.

16. A first device adapted to perform wireless communication, the first device comprising:
at least one transceiver;
at least one processor; and
at least one memory connected to the at least one processor and storing instructions that, based on being executed, cause the at least one processor to perform operations comprising:
transmitting, to a second device, sidelink control information (SCI) based on a first physical sidelink control channel (PSCCH);
transmitting, to the second device, an aperiodic sidelink channel state information-reference signal (SL CSI-RS) based on a first physical sidelink shared channel (PSSCH) related to the first PSCCH; and
receiving, from the second device, channel state information obtained based on the aperiodic SL CSI-RS,
wherein the aperiodic SL CSI-RS is transmitted only in a resource used for the first PSSCH related to the first PSCCH.

17. The first device of claim 16, wherein the aperiodic SL CSI-RS is not transmitted in a resource for a PSCCH.

18. A processing device adapted to control a first device to perform wireless communication, the processing device comprising:
at least one processor; and
at least one memory connected to the at least one processor and storing instructions that, based on being executed, cause the at least one processor to perform operations comprising:
transmitting, to a second device, sidelink control information (SCI) based on a first physical sidelink control channel (PSCCH);
transmitting, to the second device, an aperiodic sidelink channel state information-reference signal (SL CSI-RS) based on a first physical sidelink shared channel (PSSCH) related to the first PSCCH; and
receiving, from the second device, channel state information obtained based on the aperiodic SL CSI-RS,
wherein the aperiodic SL CSI-RS is transmitted only in a resource used for the first PSSCH related to the first PSCCH.

* * * * *